United States Patent
Yamaguchi

(10) Patent No.: US 7,388,899 B2
(45) Date of Patent: Jun. 17, 2008

(54) SPREADING CODE STRUCTURE FOR ULTRA WIDE BAND COMMUNICATIONS

(75) Inventor: Hirohisa Yamaguchi, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 646 days.

(21) Appl. No.: 10/395,580

(22) Filed: Mar. 24, 2003

(65) Prior Publication Data

US 2004/0179580 A1    Sep. 16, 2004

Related U.S. Application Data

(60) Provisional application No. 60/453,409, filed on Mar. 10, 2003.

(51) Int. Cl.
*H04B 1/00*    (2006.01)
(52) U.S. Cl. ............... 375/141; 375/130; 375/136; 375/137; 375/140; 375/141; 375/142; 375/143; 375/144; 375/145; 375/147; 375/148; 375/149; 375/150; 375/151; 375/152; 375/153
(58) Field of Classification Search ........ 375/130–153, 375/346–350
See application file for complete search history.

(56) References Cited

U.S. PATENT DOCUMENTS

| | | | |
|---|---|---|---|
| 5,796,760 A * | 8/1998 | Wiedeman et al. ......... 375/130 |
| 5,956,368 A * | 9/1999 | Jamal et al. ................ 375/146 |
| 6,055,281 A * | 4/2000 | Hendrickson et al. ...... 375/329 |
| 6,067,292 A * | 5/2000 | Huang et al. ............... 370/342 |
| 6,094,458 A | 7/2000 | Hellberg |
| 6,108,317 A * | 8/2000 | Jones et al. ................. 370/320 |
| 6,141,372 A * | 10/2000 | Chalmers .................... 375/147 |
| 6,381,461 B1 * | 4/2002 | Besson et al. .............. 455/450 |
| 6,763,057 B1 * | 7/2004 | Fullerton et al. ........... 375/141 |
| 6,891,897 B1 * | 5/2005 | Bevan et al. ............... 375/265 |
| 6,970,448 B1 * | 11/2005 | Sparrell et al. ............. 370/347 |
| 2001/0053175 A1 | 12/2001 | Hoctor et al. |
| 2002/0021682 A1 * | 2/2002 | Ariyoshi et al. ............ 370/335 |
| 2002/0159551 A1 * | 10/2002 | Ekvetchavit et al. ....... 375/350 |
| 2002/0167991 A1 | 11/2002 | Suzuki |
| 2002/0196845 A1 | 12/2002 | Richards et al. |
| 2004/0037380 A1 * | 2/2004 | Shan .......................... 375/346 |
| 2004/0057501 A1 * | 3/2004 | Balachandran et al. ..... 375/146 |

* cited by examiner

*Primary Examiner*—Curtis B. Odom
(74) *Attorney, Agent, or Firm*—Ronald O. Neerings; Wade J. Brady, III; Frederick J. Telecky, Jr.

(57) ABSTRACT

The ultra wide band communication system of the present invention includes a transmitter (station) and a receiver (station). The transmitter and the receiver employ spreading code comprised of code groups, which respectively comprise varied, auto-correlated codes. Consecutive information bits are spread and de-spread with differing code and the code groups are correlated with each other (e.g., orthogonal) so as to reduce channel impulse response estimation noise. At the receiver, subsequent channel estimates can be added or averaged with an initial channel estimate so as to reduce the channel impulse response estimation noise and thereby provide a relatively more accurate channel response.

9 Claims, 20 Drawing Sheets

SPREADING CODE STRUCTURE FOR ULTRA WIDE BAND COMMUNICATIONS

RELATED APPLICATION

This application claims priority to Ser. No. 60/453,409 filed Mar. 10, 2003, which is entitled "Spreading Code Structure for Ultra Wide Band Communications".

FIELD OF THE INVENTION

The present invention relates generally to the field of wireless communication, and more particularly, relates to systems and methods that generate and use spreading codes for ultra wide band communications as well as systems and methods for ultra wide band communications.

BACKGROUND OF THE INVENTION

The desire for wireless communication and faster communication speeds are considerable and ever increasing. As time goes on, more and more devices from portable computers and portable digital assistants to cellular phones are utilizing and demanding more communication speed and bandwidth. In addition to the number of devices, the amount of data being transferred via wireless communication is also increasing because of the types of data being sent. Communications have advanced from merely transporting voice data to transporting multimedia information, including graphical and video information, which employ greater amounts of information.

One particular type of wireless communication is ultra wide band communication (UWB), which operates at about the 3.1-10.6 GHz range and relies on the principle that a high data-rate communication is achievable at a small transmission power when signal bandwidth is appreciably large. As a result, UWB promises to permit high data rates for less power than at least some conventional wireless communication systems. This characteristic can permit devices to transfer more data while operating with less power, which could extend battery life of devices (e.g., cellular phones, laptop computers, and the like) along with other benefits. Additionally, UWB communication is at such a relatively low power that it can mitigate interference with other types of communication. For example, a UWB transmission could appear as merely white noise to a conventional receiver.

One potential problem or difficulty that can be encountered with substantially all wireless communication technologies, and particularly UWB, is that of multipath signals. Multipath signals are generated when a transmitter sends or broadcasts a signal, generally in all directions, and a number of copies of that signal are received at a receiver. Signals often do not travel in a straight line from a transmitter to a receiver (line of sight), but can often bounce off objects so as to end up at the receiver. The copies occur because the original signal bounces against objects during transmission resulting in the number of copies arriving at the receiver, generally with varying delays. Multipath signals can cause a receiver to misinterpret the information being transmitted and/or introduce erroneous information into communication.

Another potential problem or difficulty that can be encountered with substantially all wireless communication technologies, and particularly UWB, is channel estimate noise. Even if multipath signals are resolved or partially resolved, resultant channel estimates can contain substantial amounts of noise. This noise can lead to data errors and the like.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention provides spreading code structures that facilitate ultra wide band high data rate wireless communication. The system achieves suitable data rate performance (e.g., 100 Mbps) by suitably resolving multipaths and mitigating channel estimate noise.

The ultra wide band communication system of the present invention includes a transmitter (station) and a receiver (station). The transmitter and the receiver employ spreading code comprised of code groups, which respectively comprise varied, auto-correlated codes. Consecutive information bits are spread and de-spread with differing code and the code groups are correlated with each other (e.g., orthogonal) so as to reduce channel impulse response estimation noise. At the receiver, subsequent channel estimates can be added or averaged with an initial channel estimate so as to reduce the channel impulse response estimation noise and thereby provide a relatively more accurate channel response.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The figures provided herewith and the accompanying description of the figures are merely provided for illustrative purposes. One of ordinary skill in the art should realize, based on the instant description, other implementations and methods for fabricating the devices and structures illustrated in the figures and in the following description.

The present invention facilitates high rate data communication at relatively low transmission power for ultra wide band communication (UWB) systems. UWB systems operate at about the 3.1-10.6 GHz range and rely on the principle that a high data-rate communication is achievable at a small transmission power when signal bandwidth is appreciably large. The present invention can be employed to provide and/or facilitate wireless local area networks, cellular type wireless communication, positioning systems, and the like. Additionally, the present invention suitably resolves multipath signals while mitigating channel estimate noise.

Figure 1:
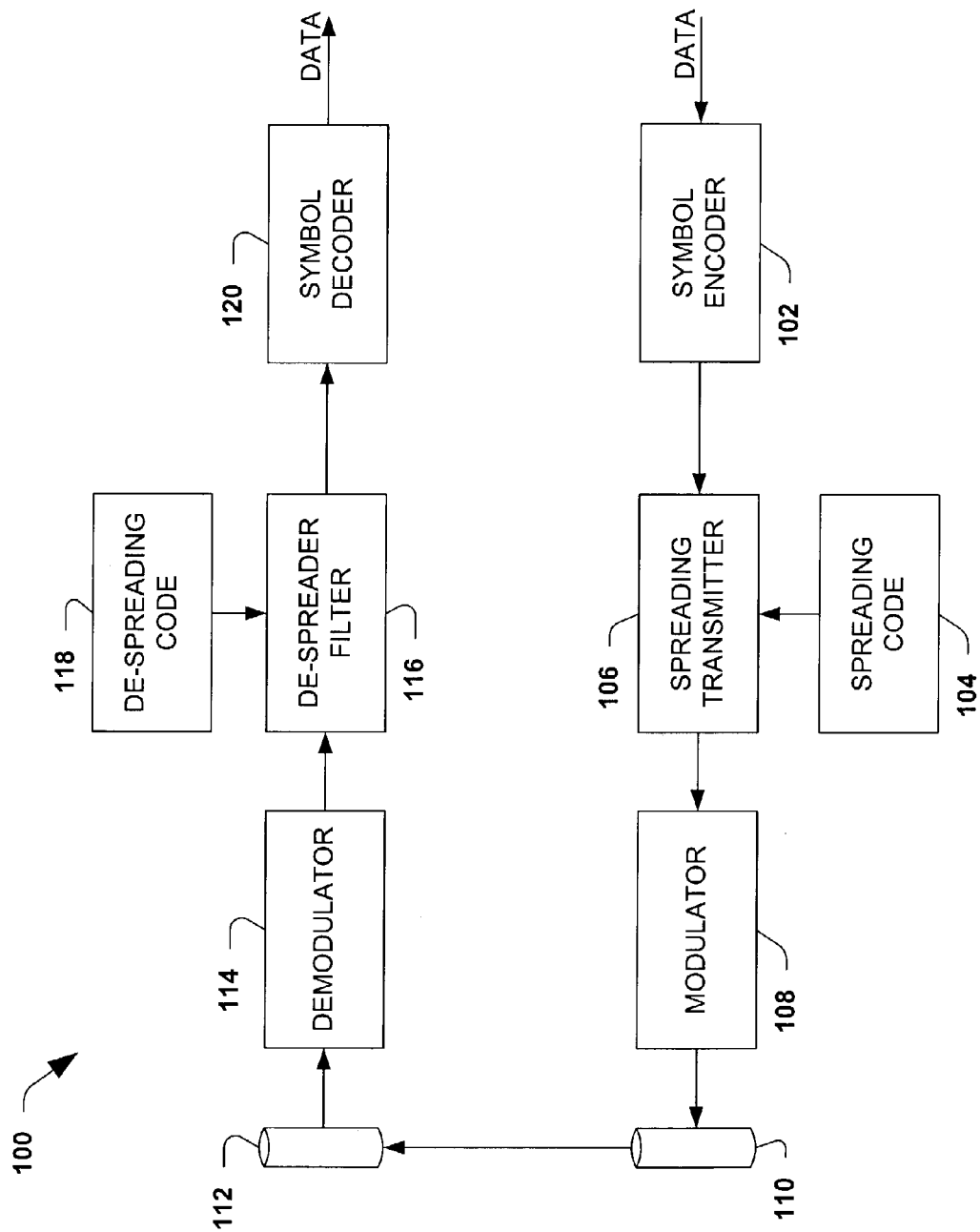
FIG. 1 is block diagram illustrating an ultra wide band communication system in accordance with an aspect of the present invention.

Beginning with FIG. 1, an ultra wide band (UWB) communication system 100 in accordance with an aspect of the present invention is disclosed. The system 100 is operable to transmit and receive information/data at high data rates (e.g., 100 Mbps) with relatively low power. The data rate is partly distance-dependent. For example, 100 to 110 Mbps is possible for line-of-sight transmissions greater than about 10 meters. Even higher data rates are possible (e.g., 400 Mbps) for transmission paths that are less than or equal to about 5 meters.

The system 100 includes a transceiver or transmitter station for sending information and signals and a receiver or receiver station for receiving signals and information. For illustrative purposes, the system 100 is described with respect to a single transmitter station and a single receiver station, however the present invention can include additional transmitter stations and receiver stations and still be in accordance with the present invention. Additionally, transmitter station(s) and receiver station(s) can be on one device (e.g., a computer system) and be in accordance with the present invention.

The system 100 shows the general system structure of the communication system in which spreading code is used to share the same bandwidth by multiple users or all users of the system 100. Respective users (receiver stations) have filters that identify and obtain information intended for them and are not generally able to obtain information not intended for them. The system 100 is operable to broadcast or transmit information such that more than one receiver station is able to obtain the transmitted information and still is in accordance with the present invention.

Starting with the transmitter station (e.g., also referred to as base station, mobile station, transceiver, and the like), a symbol encoder 102 receives some information or data and encodes the information into an original, digital signal. The information received can be about any type of data or information representable electronically. For example, the information could be a portion of a data file, multimedia information, database information, and the like. For another example, the information could be analog voice data for voice communication. The encoded information, the original signal, can be a compressed and/or encrypted representation of the original information.

A spreading transmitter 106 receives the signal from the symbol encoder 102. The spreading transmitter 106 utilizes a spreading code 104 to spread each information bit of the original signal into a number (e.g., several dozens) of small power impulse signals under a spectrum mark constant. Generally, each information bit is spread with a code sequence, which results in a number of impulse signals, referred to as code spread impulse signals. Spreading codes are sequences of numbers such as, −1 and +1 or a sequence of complex numbers $(1+j)/\sqrt{2}$, $(1-j)/\sqrt{2}$, and the like, employed on transmitting and receiving ends of communication systems in order to permit a transmitted signal to be obtained and distinguished from other signals present at the receiving end. The spreading code 104 permits adding channel impulse response estimates over subsequent code intervals in order to reduce estimation noise. Additionally, the spreading code 104 facilitates resolving multipath signals.

The spreading code 104 has good autocorrelation properties (i.e., the pattern matching results 1 for the matched position and 0 for the rest) and may have an introduced orthogonality. One mechanism of obtaining the spreading code 104 with suitable properties is to introduce orthogonality to Gold codes, which are codes with the same length, relatively good cross-correlation properties, and relatively good auto-correlation properties. The orthogonality can be introduced by multiplying groups or intervals of varied, Gold codes (e.g., 32) by different orthogonal codes. This group of varied Gold codes can also be referred to as a basic data slot. Hadamard codes are suitable orthogonal codes that can be utilized to introduce the orthogonality into groups or basic data slots. Hadamard codes are periodic codes that, when synchronized, have the desired orthogonal property. As a result, the groups of Gold codes are orthogonal to each other. Further descriptions of introducing orthogonality into auto-correlated codes to yield suitable spreading codes that can be employed for the spreading code 104 are provided infra. Additionally, other suitable orthogonal and auto-correlated codes can be employed and still be in accordance with the present invention.

Another mechanism to obtain the spreading code 104 with suitable properties is to employ a long, auto-correlated code, such as Gold codes. The long code should possess a good auto-correlation property that is also inherent in short-length intervals. One such exemplary long code is a long Gold code with a 1024 impulse length (32×32=1024). The long code is segmented into a number of blocks, also referred to as basic data slots. For the long Gold code with the 1024 impulse length, a suitable block size is 32 resulting in 32 blocks. Other suitable mechanisms to obtain the spreading code 104 with suitable properties can be employed and still be in accordance with the present invention so long as the obtained code can reduce estimation noise by adding channel impulse response estimates over subsequent intervals or basic data slots.

A modulator 108 receives the original signal, now spread, from the spreading transmitter and modulates the signal from a base-band to an ultra wide band frequency suitable for transmission. Additionally, the modulator 108 performs a digital to analog conversion on the original signal prior to modulation. A transceiver device 110 transmits or broadcasts the modulated original signal in a plurality of directions.

At a receiver station, a receiving device 112 (e.g., an antenna or multiple antennas) receives a signal. The received signal is generally a composite of one or more signals, which can include one or more multipath signals. Multipath signals are versions or copies of the transmitted signal that followed varied transmission paths. An additional description of multipath signals is provided infra. The one or more signals of the received signal can also include other unknown/undesired signals, unintended signals (e.g., signals intended for another receiver station) and/or noise. A demodulator 114 takes the received signal and demodulates the received signal from an ultra wide band frequency to a base-band. By so doing, some noise and/or unwanted signals can be removed from the received signal. Additionally, the demodulator 114 typically performs an analog to digital conversion on the received signal.

A de-spreader filter 116 receives the signal from the demodulator 114 and filters and removes unwanted and duplicate signals to substantially obtain the original signal previously sent from the transmitter 110. The de-spreader filter 116 employs a de-spreading code 118 that corresponds or is identical to the spreading code employed in transmission. The de-spreader filter 116 performs delay-profile measurements concurrently with de-spreading of the received signal. Additionally, the de-spreader filter 116 is configurable to specific delay profiles, such as an indoor delay profile.

The de-spreading code 118 is, like the spreading code employed in transmission, organized into groups or basic data slots of a specified number of codes. The de-spreader filter 116 is operable to add or average channel impulse response estimates over subsequent basic data slots in order to reduce channel estimation noise, thus obtaining a relatively more accurate representation of the original signal.

Depending on the room size, the indoor path delay time has been measured to lie in the 30 to 100 nsec range. This is additional delay after the earliest wave reaches at the receiver, and corresponds to the reflections from the walls and the floor. In the line-of-sight case, the earliest arrival time is exactly the distance divided by the speed of light.

A symbol decoder 120 operates on the original signal to decode and/or decrypt the original signal to obtain the original information/data, which can then be processed by a higher layer (e.g., error correction, decryption, decompression, and the like) and/or utilized. The original information can then be used, for example, by a computer, personal digital assistant, cellular phone, or other electronic device.

It is appreciated that one or both of the transmitter station and the receiver station are mobile devices (e.g., cellular phones, laptop computers, personal digital assistants, positioning systems, and the like). Additionally, as stated above, the system 100 can include multiple transmitter stations and receiver stations. Furthermore, a single device can have both a transmitter station and a receiver station to permit full duplex communication.

Figure 2:
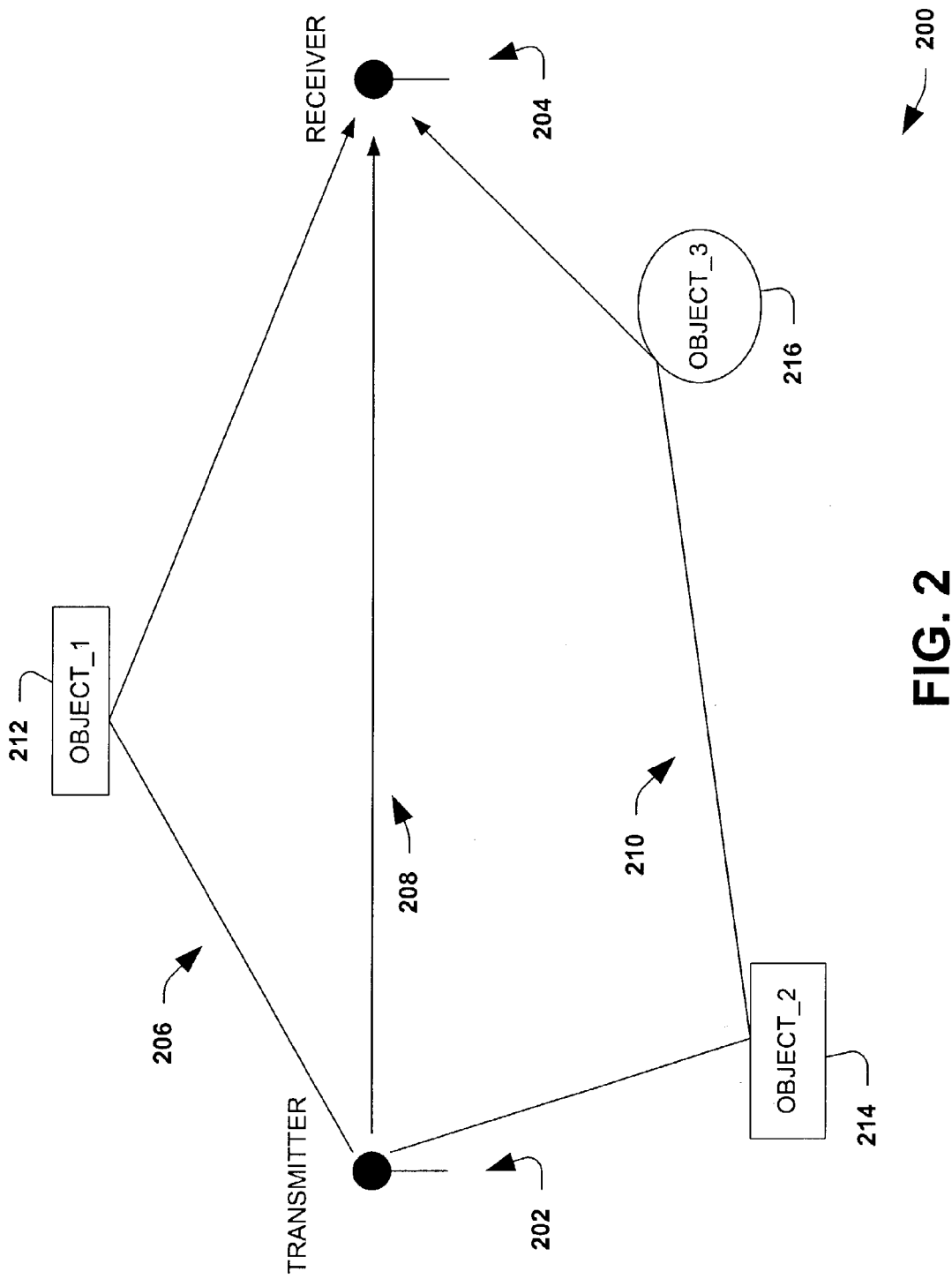
FIG. 2 is a diagram illustrating generation of multipath signals.

Turning now to FIG. 2, a diagram illustrating generation of multipath signals is shown. The diagram is exemplary in nature and provided merely for the purposes of illustrating multipath signals and is not intended to limit and/or restrict the present invention to a particular operating environment or number of multipath signals.

The generated signals shown follow transmission paths from a transmitter 202 to a receiver 204, which are in accordance with the present invention. The transmitter 202 is operable to send or broadcast a signal in many directions. Here, a first signal 206, a second signal 208, and a third signal 210 are depicted as being transmitted. Initially, the signals are substantially identical, but each of the signals follows a different transmission path, also referred to as path of propagation. The first signal 206 bounces off a first object 212 and continues along to the receiver 204. The second signal 208 follows a straight line or line of sight path from the transmitter 202 to the receiver 204. The third signal 210 bounces off a second object 214 and a third object 216 before arriving at the receiver 204. As a result, the first signal 206, the second signal 208, and the third signal 210 can arrive at the receiver at varied times with varied power because of the variations in path length, propagation mediums and the like. Because of the present invention as discussed herein, the receiver 204 is able to obtain a substantially true or original signal from the multiple signals received with a relatively low amount of noise.

Figure 3:
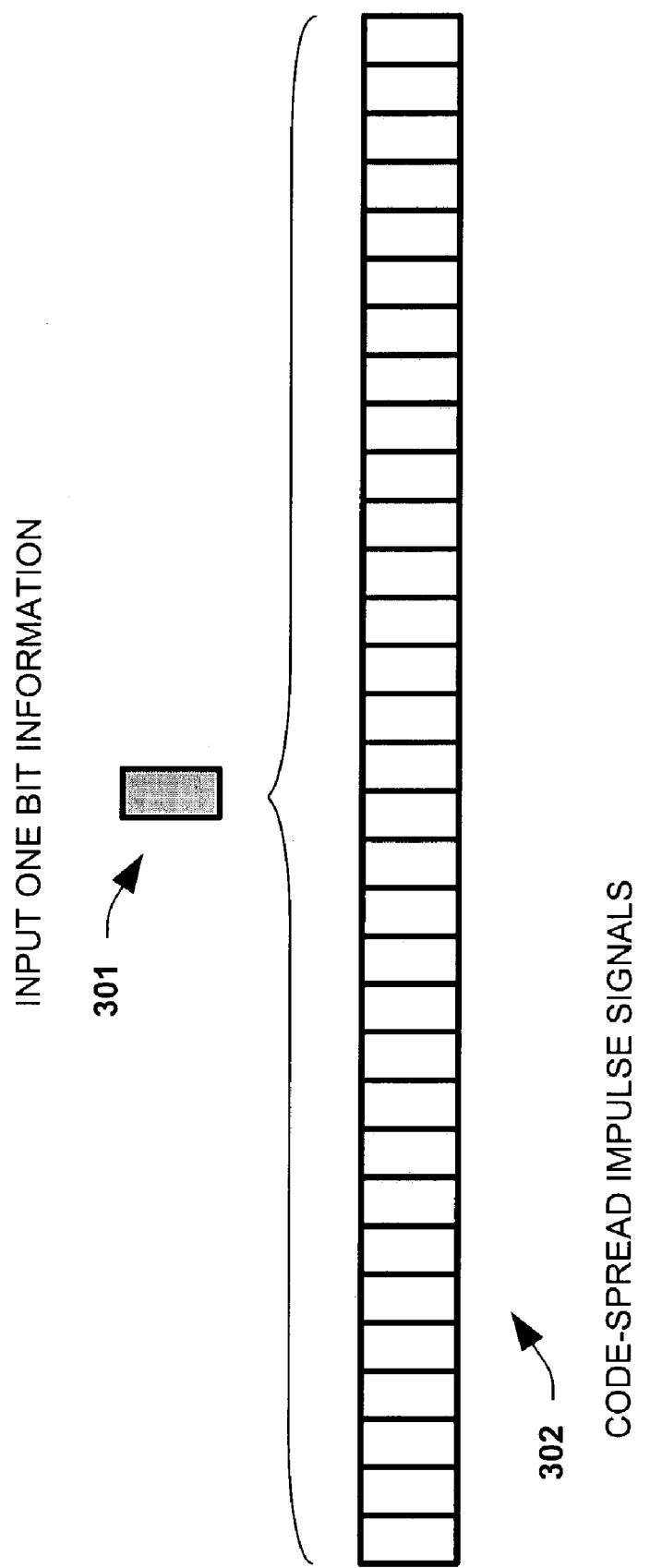
FIG. 3 is a diagram illustrating an exemplary single information bit spread into a group of impulse signals.

FIG. 3 illustrates a single information bit that is spread and transmitted by a transmitter as a group of impulse signals 302, referred to as code-spread impulse signals. It is appreciated that for ultra wide band communication systems, a single information bit is typically spread over about more than 40 impulse signals and about less than 200 impulse signals. However, any suitable number of impulse signals per information bit is contemplated and in accordance with the present invention.

For example, when 100 Mbps of information is transmitted over a bandwidth of 4 GHz, each impulse is 250 psec in duration and 4 G impulse signals can be transmitted per second. Thus 40 impulse signals are assigned to each bit (4 G/100, M=40). When 20 Mbps are transmitted (at a larger distance), 4 G/20 M=200 impulses are assigned to each one bit. A UWB system of the present invention can flexibly assign the number of impulses to each one bit of the transmitted information depending on distance, desired data rate and channel condition.

It is appreciated that such large numbers of impulse signals for a single information bit can generate large numbers of multipath signals, which have been described supra.

Figure 4:
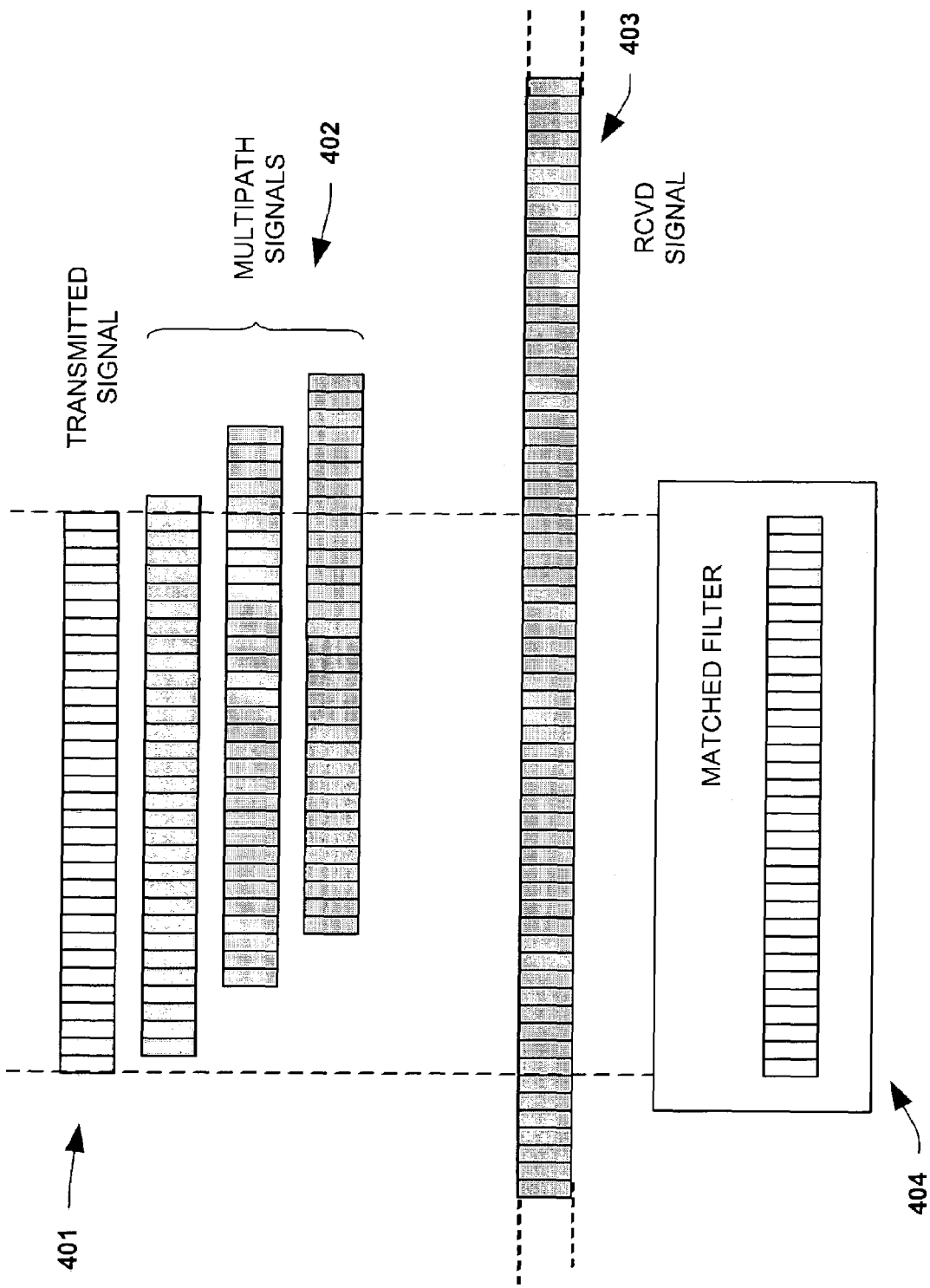
FIG. 4 is a diagram illustrating exemplary signals for a wireless communication system.

FIG. 4 illustrates exemplary signals for an ultra wide band wireless communication system. A transmitted signal 401, comprised of a group of code-spread impulse signals, generates a number of multipath signals 402 as a result of objects interfering and/or altering transmission paths. As a result, a receiver receives a received signal 403 comprised of the transmitted signal 401 along with the multipath signals 402. A matched filter 404 or other similar component is employed to extract the transmitted signal 401 or a close approximation thereof.

Figure 5:
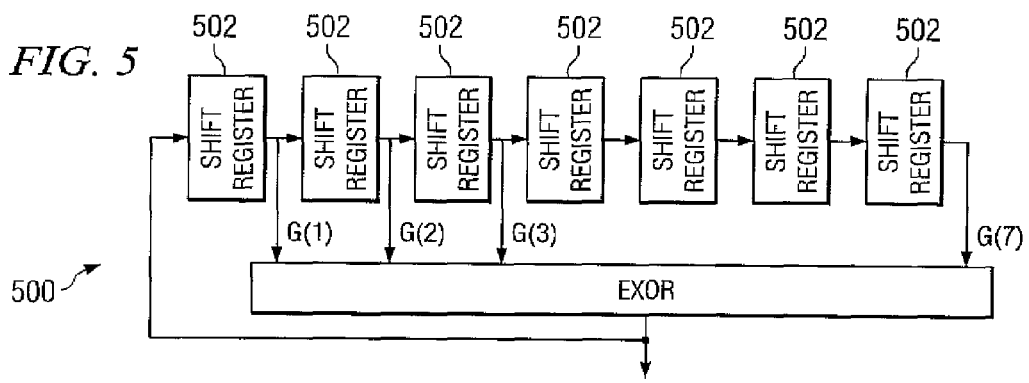
FIG. 5 is a diagram illustrating an exemplary spreading code sequence generator.

In order for the receiver to obtain the transmitted signal 401, the received signal 403 needs to be resolved. The received signal 403 can be resolved if the transmitted signal possesses a specific auto correlation property. One suitable correlation or spreading code sequence is $\{b(n)\}$ $n=1, \ldots N$ generated as an M-sequence with the following characteristic:

$$\sum_{n=0}^{N-1} b(n)b(n-k) = 1 \ (k = 0) \quad (1)$$
$$= -\frac{1}{N} (\text{else}).$$

Where N is the number of impulse signals allocated to each information bit, and it is also the repetition cycle of the M-sequence and b(n) are spreading factors. FIG. 5 depicts an exemplary suitable M-sequence generating circuit 500 that employs a plurality of shift registers 502. The circuit 500 generates codes of 127 bit cycles. A '0' bit is added at the end of each 127 bit cycle in order to complete a 128 bit sequence. The spreading factors correspond to multipath delay.

Figure 6:
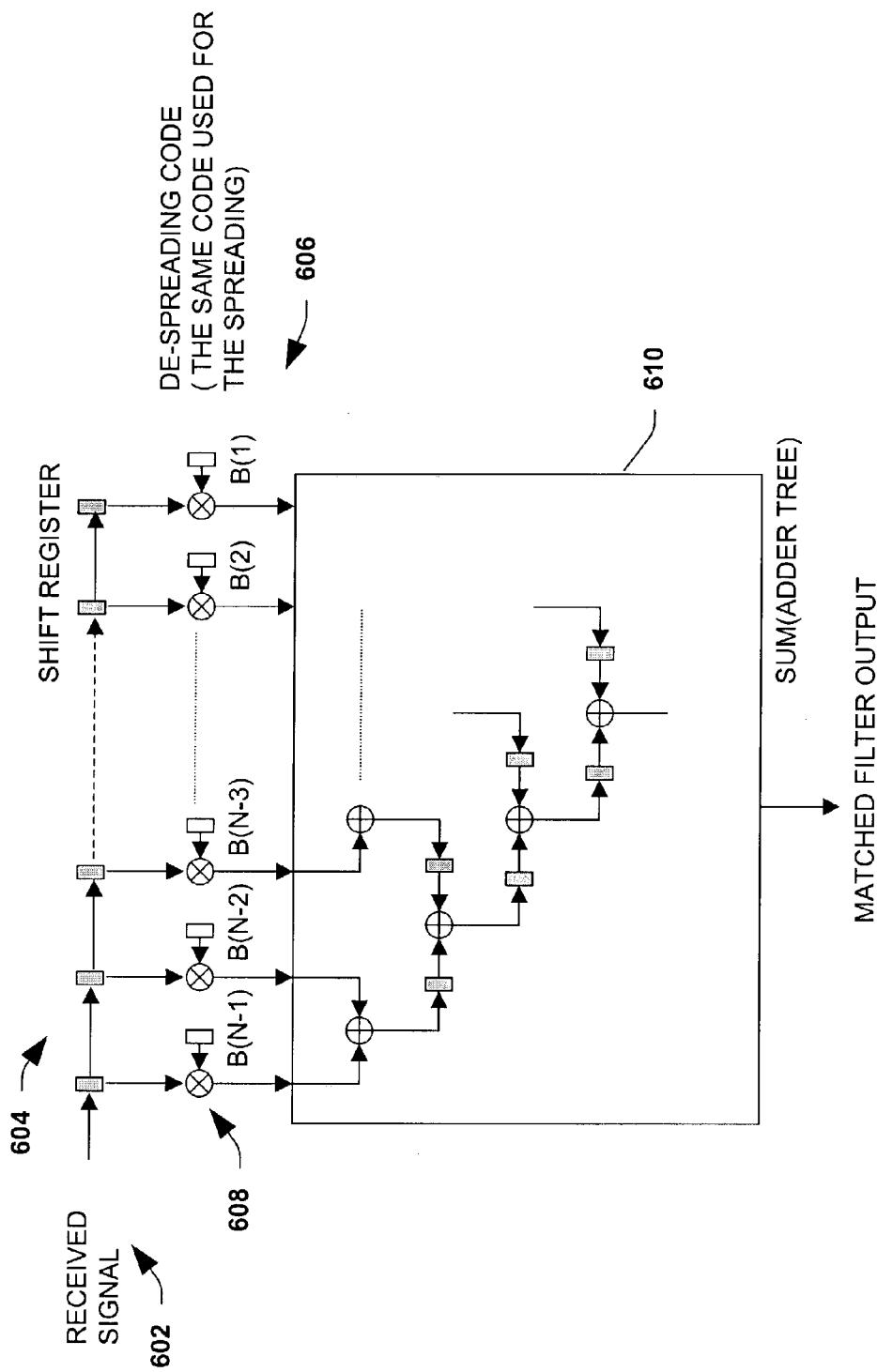
FIG. 6 is a diagram illustrating an exemplary receiver operation in accordance with an aspect of the present invention.

FIG. 6 illustrates an exemplary matched filter/receiver operation 600 that obtains the transmitted signal from a received signal 602 (e.g., the transmitted signal 401 and received signal 403 of FIG. 4).

An analog filter (not shown) matches the received signal to an incoming impulse signal shape. The received signal 602 is then sampled and input into a number of shift registers 604 that respectively transfers the received signal in synchronism with de-spreading code timing. A number of de-spread multipliers 608 multiply respective outputs of the shift registers 604 with de-spreading code 606 (e.g., sign only). An adder tree 610 adds respective results from the de-spread multipliers together.

The adder tree 610 can be relatively large, particularly for ultra wide bandwidth communications. The adder tree is required to operate at the same relatively high speed of the shift registers 604 and requires substantially high accuracy.

A typical exemplary ultra wide band wireless communication employs an impulse duration of about 250 psec and achieves or attempts to achieve an information data rate of 100 Mbps (mega bits per second). For this impulse duration, the maximum number of transmitted non-overlapping impulse signals is about 4×10⁹ (4 G signals per second). In order to achieve the desired information data rate of 100 Mbps (mega bits per second), the number of code-spread impulse signals or spreading factor assigned to each information bit is about 40. The code-spread impulse signals are spread with a single or constant spreading code. As a result, a group of impulse signals for an information bit requires a 10 nsec duration for the group of impulse signals (250 psec×40 impulse signals). For a typical indoor environment, typical signal delays extend to about 100 to 150 nsec. A typical, conventional matched filter needs to be locked to the de-spreading of one particular code during this period. Therefore, it is not possible to spread the consecutive information bits using the same spreading code and achieve the desired 100 Mbps information data rate.

Figure 7A:
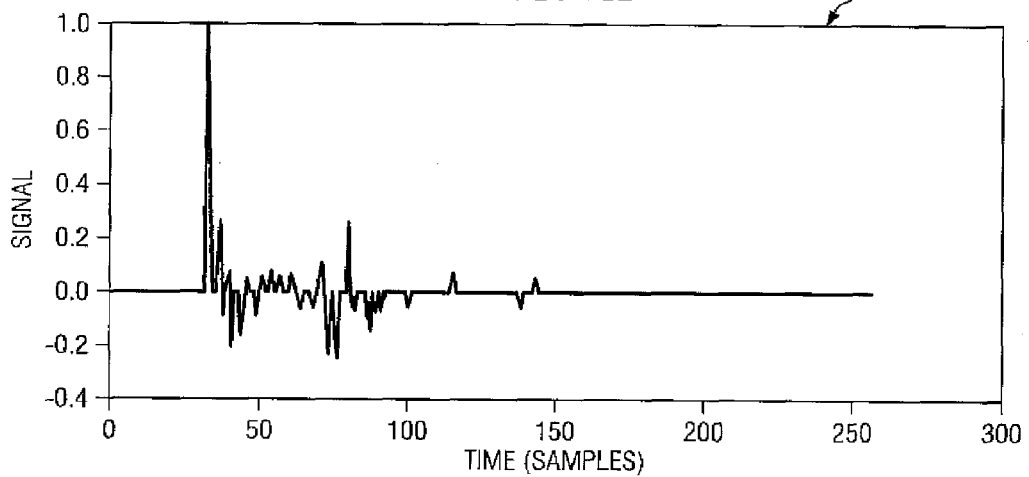
FIG. 7 is a graph illustrating a simulation of a communication wherein one particular spreading code is employed for consecutive information bits.
Figure 7B:
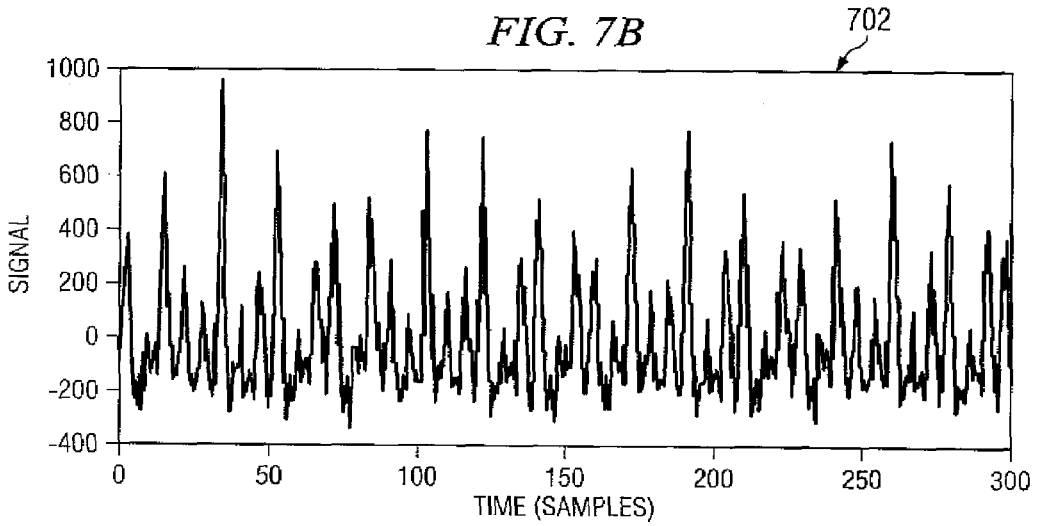

FIG. 7 depicts a simulation of a communication wherein one particular (de-)spreading code is employed for consecutive information bits. An x-axis of FIG. 7 represents time (samples) and a y-axis represents signal strength. Plot 701 simulates a transmitted signal, also referred to as an actual channel response and plot 702 simulates a measured channel response. The simulation assumes a residential environment, non-line-of-sight (NLOS) transmission paths, and a communication distance of about 4.4 meters. A sample time of 250 psec is used, which results in a duration of about 25 nsec for 100 sample times. As a result, one information bit is spread over 32 impulse signals and has a duration of about 8 nsec. The transmitted signal of plot 701 includes a largest-power path at the 20$^{th}$ sample time (within the spreading-code duration of 32 sample time) and two delayed paths that occur at the 50$^{th}$ sample time and the 77$^{th}$ sample time.

As stated above, plot 702 depicts a measured channel response (e.g., received and processed via a matched filter at a receiver station) in which a single spreading code is used to code-spread consecutive information bits. Due to the limitations of the single spreading code for all of the information bits, the matched filter is unable to resolve the received signal and substantially obtain the original transmitted signal. The single spreading code does not permit the matched filter to resolve multipath signals and the like in order to substantially obtain the original transmitted signal.

However, groups of spreading codes can be employed for spreading the group of impulse signals for each information bit instead of a single spreading code. Unlike the above example, subsequent information bits are code-spread using different spreading codes with sufficient auto-correlation properties (e.g., Gold codes, which are auto-correlating spreading codes). In order to achieve the desired information data rate of 100 Mbps, an impulse transmission rate is about 4×10⁹ (4 G signals per second) and a code-spread group of 32 impulse signals per information bit.

Figure 8:
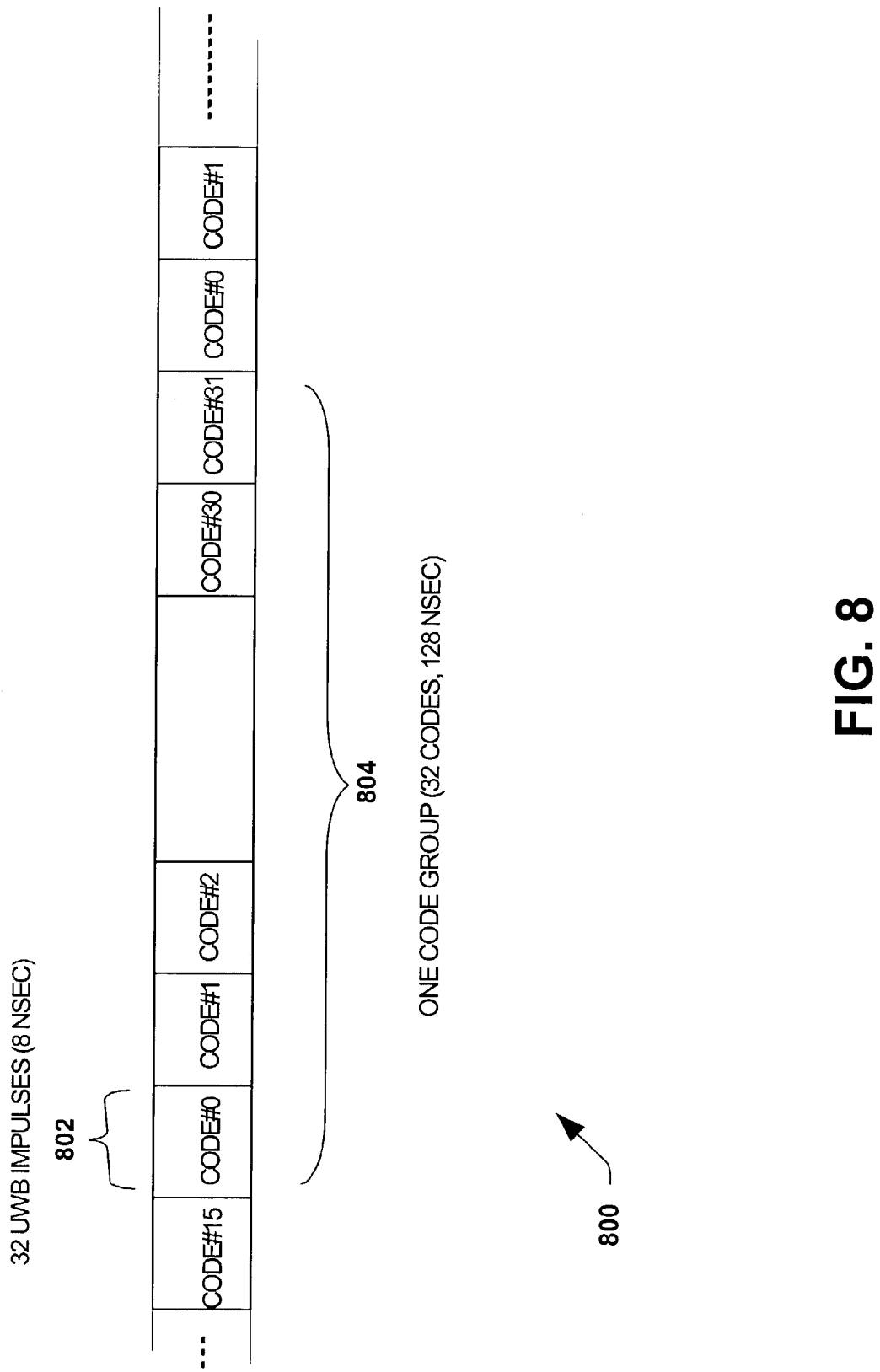
FIG. 8 is a diagram illustrating an exemplary transmitted code spread signal in accordance with an aspect of the present invention.

FIG. 8 illustrates an exemplary transmitted code spread signal 800. A code group 804 is comprised of 32 codes and has a duration of 256 nsec in this example. Each code of the code group 804 is used for 32 ultra wide band impulses (N=32) and has a duration of 8 nsec. With N=32 as shown in FIG. 8, there exist 32+2 different gold codes with the desired property. For this example, 32 Gold codes have been selected for FIG. 8. This exemplary transmitted code spread signal 800 permits a maximum path delay of up to 256 nsec (32 impulse signals×32 codes×250 psec(impulse duration)), which is suitable for typical indoor environments.

Figure 9:
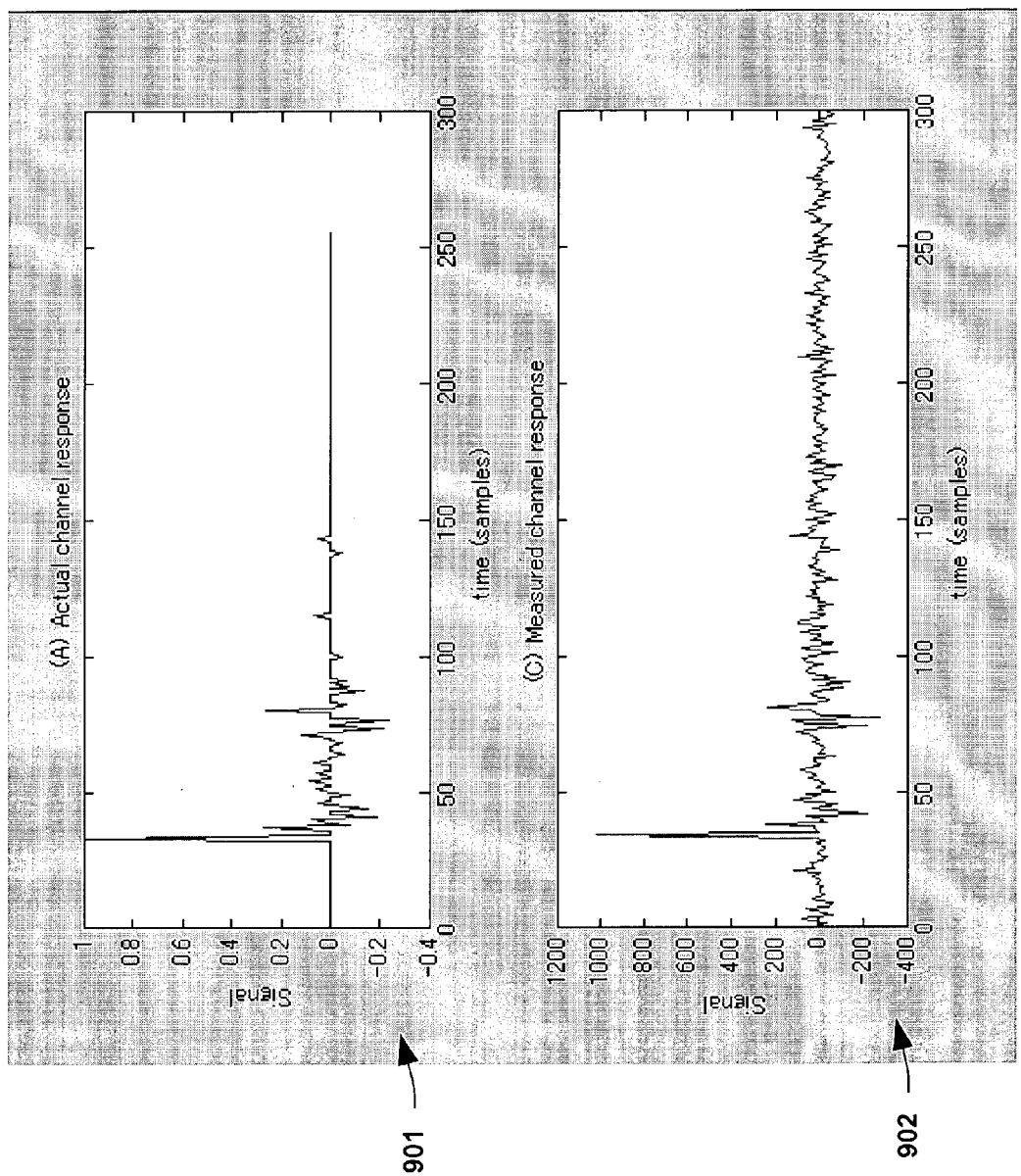
FIG. 9 is a graph illustrating a simulation of a communication employing constant spreading code for successive information bits in accordance with an aspect of the present invention.

FIG. 9 depicts a simulation of a communication/transmission employing the varied code structure of FIG. 8. An x-axis of FIG. 9 represents time (samples) and a y-axis represents signal strength. Plot 901 simulates a transmitted signal, also referred to as an actual channel response and plot 902 simulates a measured channel response. The simulation also assumes a residential environment, non-line-of-sight (NLOS) transmission paths, and a communication distance of about 4.4 meters. A sample time of 250 psec is used, which results in a duration of about 25 nsec for 100 sample times. As a result, one information bit is spread over 32 impulse signals and has a duration of about 8 nsec. The transmitted signal of plot 901 includes a largest-power path at the $20^{th}$ sample time (within the spreading-code duration of 32 sample time) and two delayed paths that occur at the $50^{th}$ sample time and the $77^{th}$ sample time.

As stated above, plot 902 depicts a measured channel response (e.g., received and processed via a matched filter at a receiver station) in which auto-correlated (e.g., Gold codes) are used to code-spread the information bits. Because of the auto-correlated spreading codes, a plurality of matched filters operating in parallel are able to resolve multipath signals and substantially obtain the original transmitted signal.

However, plot 902 demonstrates that the channel response still contains a substantial amount of noise. Eq. (1) illustrates that the auto-correlation of a general finit-length code, such as a Gold code, is not a delta function. This results in the non-zero noise in the estimated channel response of plot 902.

It is appreciated that adding channel response estimates over subsequent code groups would likely fail to reduce the estimation noise because the estimation noise from each group is not orthogonal to each other. Accordingly, it is appreciated that introducing orthogonality into the code groups or intervals results in at least a portion of the estimation noise for respective code groups being orthogonal to each other. As a result, adding such modified channel estimates can reduce the estimation noise.

Figure 10:
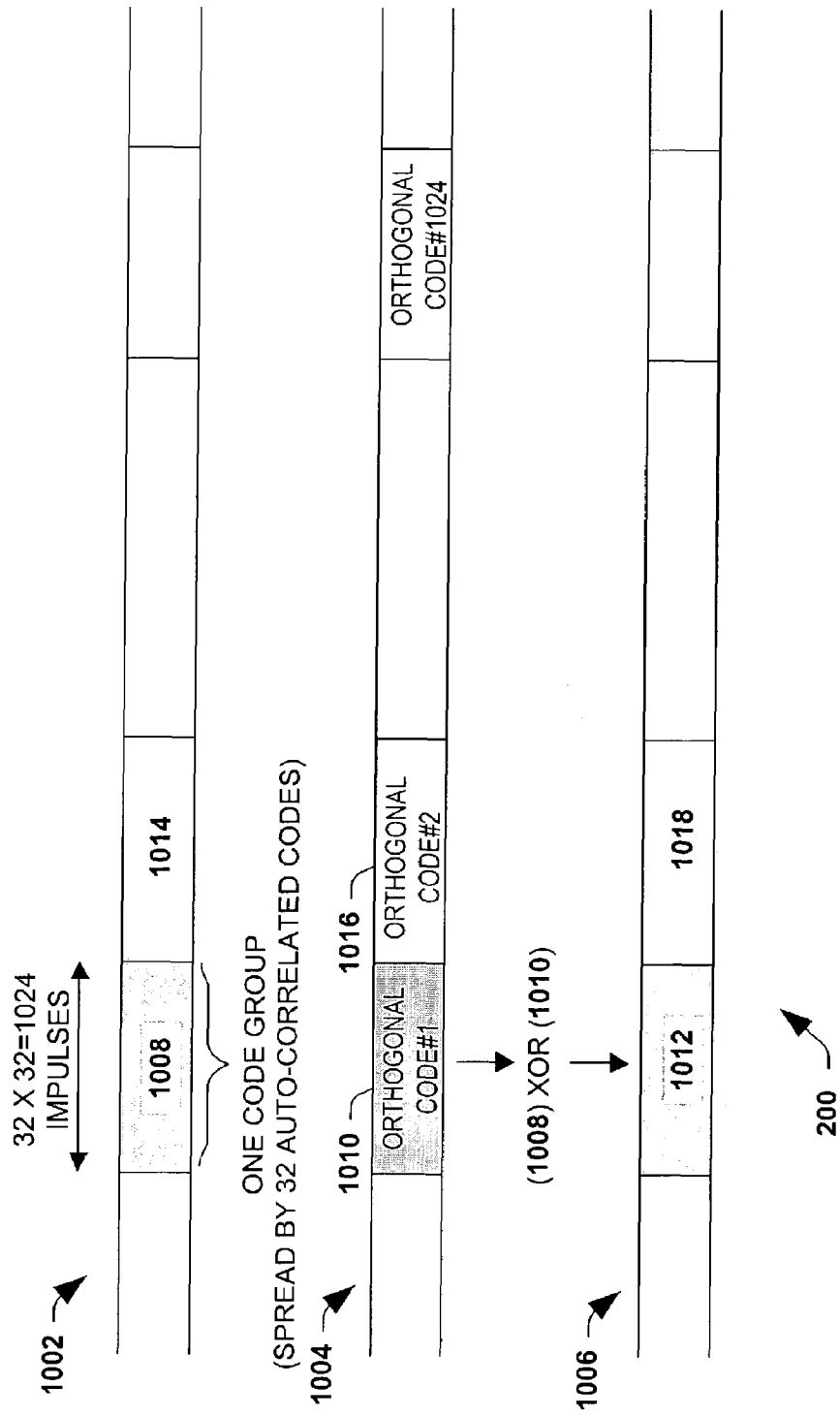
FIG. 10 is a diagram illustrating exemplary spreading code generation in accordance with an aspect of the present invention.

FIG. 10 is a diagram illustrating exemplary spreading code generation in accordance with an aspect of the present invention. The generated spreading codes are auto-correlated within groups or intervals and the groups or intervals of codes are orthogonal to each other. The spreading code generated permits adding channel impulse response estimates or channel estimates over code intervals or groups so as to reduce estimation noise. Additionally, the spreading code generated facilitates multipath reconciliation, particularly for indoor delay environments.

A series of code groups 1002, a series of orthogonal codes 1004, and a series of generated code groups 1006 are illustrated in the diagram. Each code group of the series of code groups 1002 comprises 32 auto-correlated codes, wherein each of the auto-correlated codes is associated with a single information bit. Generally, each code group in the series is identical. A sequence generator can generate the series of code groups 1002. As an example, 32 impulse signals are utilized per information bit, which results in an impulse count or length for each group of 32×32=1024. It is appreciated that the present invention is not limited to a particular number of impulse signals for respective information bits or to a particular number of codes in a group. A series of different orthogonal codes 1004 are also depicted in the diagram. The orthogonal series 1004 includes 1024 different orthogonal codes, in this example, that are orthogonal to each other. A number of suitable types of orthogonal codes can be employed for the series 1004 such as, Hadamard (Walsh) codes and the like. An orthogonal sequence generator is typically employed to generate the orthogonal code series 1004. Each code group, also referred to as a basic data slot, is multiplied via an XOR operation by a different orthogonal code of the series 1004. The result is a series of a number of auto-correlated, orthogonal code groups 1006, also referred to as basic data code groups 1006.

Generally, the size of the group codes is determined by two factors: the number of impulse signals used to spread each information bit, the spreading ratio, and the signal to noise ratio of the received signal. The spreading ratio is a function of the transmission distance, such as 2, 4, 8, 16, and the like. Generally, a higher spreading ratio or pulse repletion ratio is used for longer transmission distances in order to maintain the same signal power level or a suitable power level at the receiver. The signal to noise ratio determines the required time for noise reduction of the channel estimation. When the channel is relatively stable, the estimation time can be larger, thus permitting a larger code length (e.g., 1024, 2048, 4096, . . . ). As an example, a relatively long transmission distance with a poor or low signal to noise ratio could require a group size of 16, whereas a relative short transmission distance with a good or high signal t noise ratio could employ a group size of 64.

As an example, a code group 1008 is one group in the series of code groups 1002. The code group 1008 is multiplied by a first orthogonal code 1010, in this example, to generate a first code group 1012. Continuing, a second code group 1014 is another group in the series of code groups 1002. The second code group 1014 is multiplied by a second orthogonal code 1016, in this example, to generate a second code group 1018. Because of the introduced orthogonality, the first code group 1012 is orthogonal to the second code group 1018. As such, addition of channel impulse response estimates for these groups 1012 and 1018 can reduce noise in the estimation because at least a portion of the noise in each estimate is orthogonal to the other.

Figure 11:
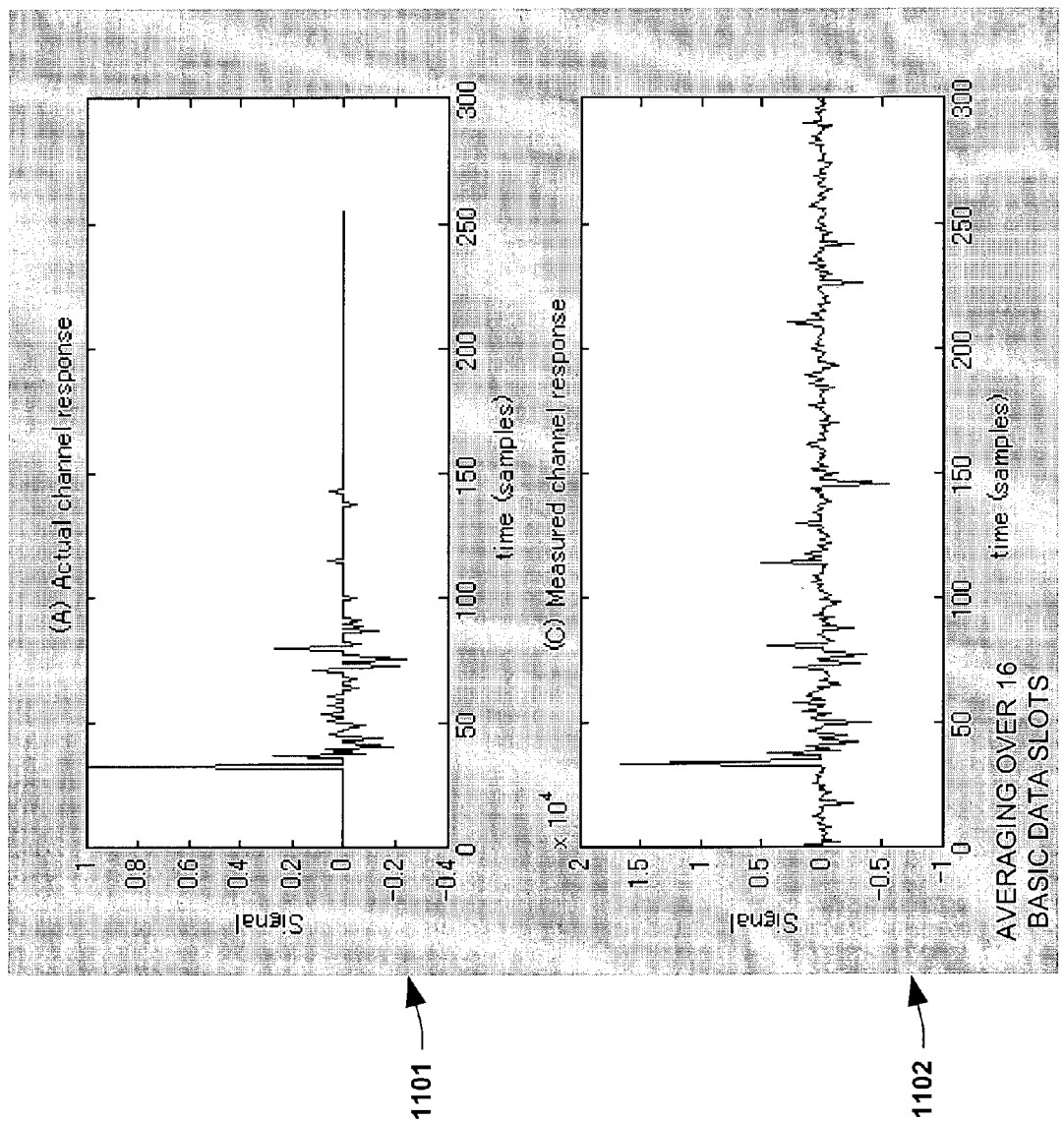
FIG. 11 is a graph illustrating a simulation of a communication employing code groups comprised of varied, auto-correlated codes and averaging over 16 basic data slots in accordance with an aspect of the present invention.

FIG. 11 depicts a simulation of a communication/transmission employing the code structure of FIG. 10, wherein code groups comprised of varied, auto-correlated codes are orthogonal to each other. An x-axis of FIG. 11 represents time (samples) and a y-axis represents signal strength. Plot 1101 simulates a transmitted signal, also referred to as an actual channel response and plot 1102 simulates a measured channel response. The simulation also assumes a residential environment, non-line-of-sight (NLOS) transmission paths, and a communication distance of about 4.4 meters. A sample time of 250 psec is used, which results in a duration of about 25 nsec for 100 sample times. As a result, one information bit is spread over 32 impulse signals and has a duration of about 8 nsec. The transmitted signal of plot 1101 includes a largest-power path at the $20^{th}$ sample time (within the spreading-code duration of 32 sample time) and two delayed paths that occur at the $50^{th}$ sample time and the $77^{th}$ sample time.

As stated above, plot 1102 depicts a measured channel response (e.g., received and processed via a matched filter at a receiver station) in which spreading code comprised of orthogonal groups of auto-correlated and varied codes (e.g., Gold codes) are used to code-spread the information bits. Subsequent channel impulse responses for a number of data blocks are added together to reduce noise in the measured channel response.

The measured channel response is averaged over 16 basic data slots in this simulation. A substantial reduction in noise is not noticeable from the plot 1102 as compared with plot 902 of FIG. 9, in which response averaging was not performed.

Figure 12:
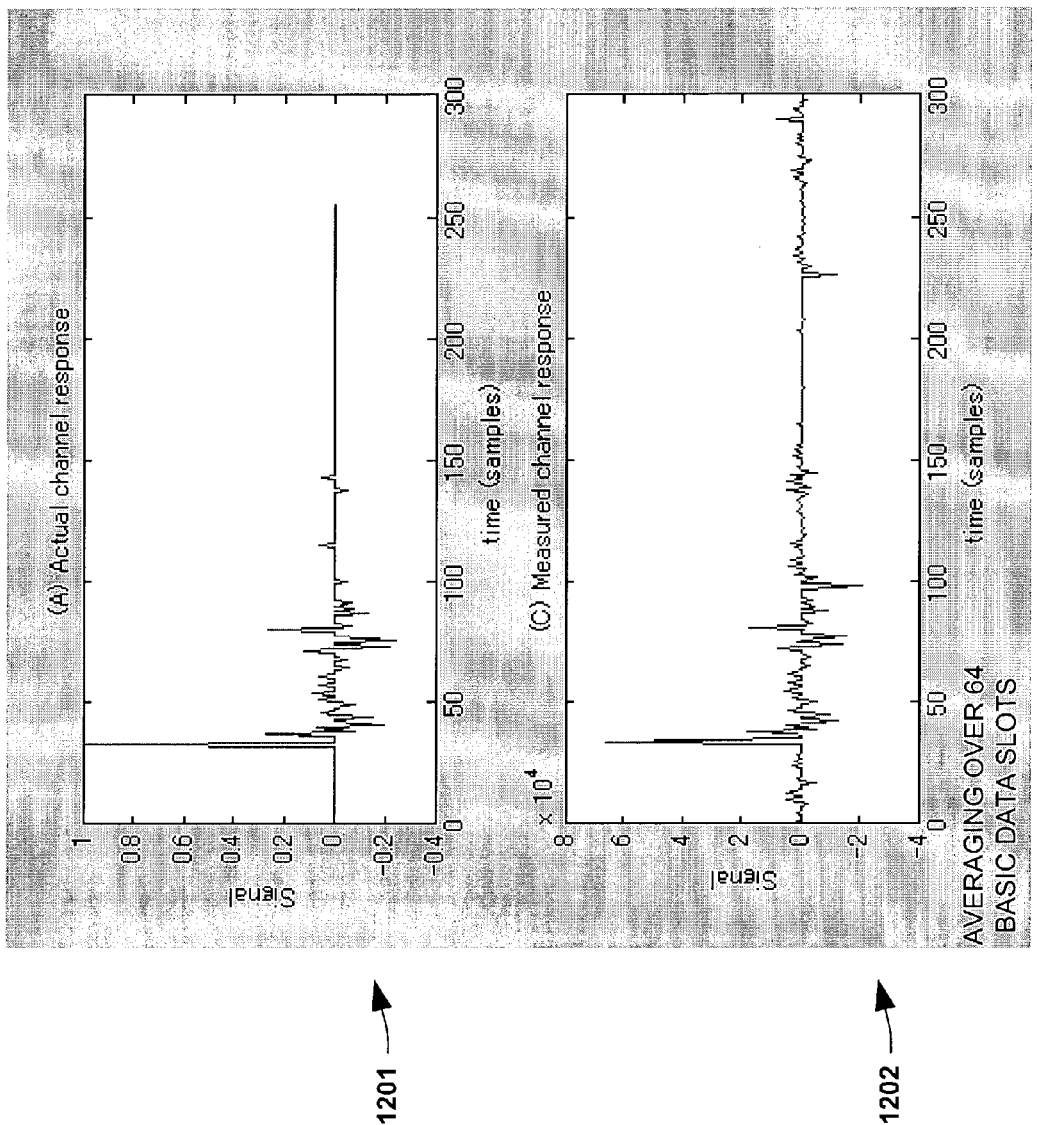
FIG. 12 is a graph illustrating a simulation of a communication employing code groups comprised of varied, auto-correlated codes and averaging over 64 basic data slots in accordance with an aspect of the present invention.

FIG. 12 depicts a simulation of a communication/transmission employing the code structure of FIG. 10, wherein code groups comprised of varied, auto-correlated codes are orthogonal to each other. An x-axis of FIG. 12 represents time (samples) and a y-axis represents signal strength. Plot 1201 simulates a transmitted signal, also referred to as an actual channel response and plot 1202 simulates a measured channel response. The simulation also assumes a residential environment, non-line-of-sight (NLOS) transmission paths, and a communication distance of about 4.4 meters. A sample time of 250 psec is used, which results in a duration of about 25 nsec for 100 sample times. As a result, one information bit is spread over 32 impulse signals and has a duration of about 8 nsec. The transmitted signal of plot 1201 includes a largest-power path at the $20^{th}$ sample time (within the spreading-code duration of 32 sample time) and two delayed paths that occur at the $50^{th}$ sample time and the $77^{th}$ sample time.

As stated above, plot 1202 depicts a measured channel response (e.g., received and processed via a matched filter at a receiver station) in which spreading code comprised of orthogonal groups of auto-correlated and varied codes (e.g., Gold codes) are used to code-spread the information bits. Subsequent channel impulse responses for a number of data blocks are added together to reduce noise in the measured channel response.

The measured channel response is averaged over 64 basic data slots in this simulation. A substantial reduction in noise is noticeable from the plot 1202 as compared with plot 902 of FIG. 9 and plot 1102 of FIG. 11. However, some noise is still visible in the measured channel response.

Figure 13:
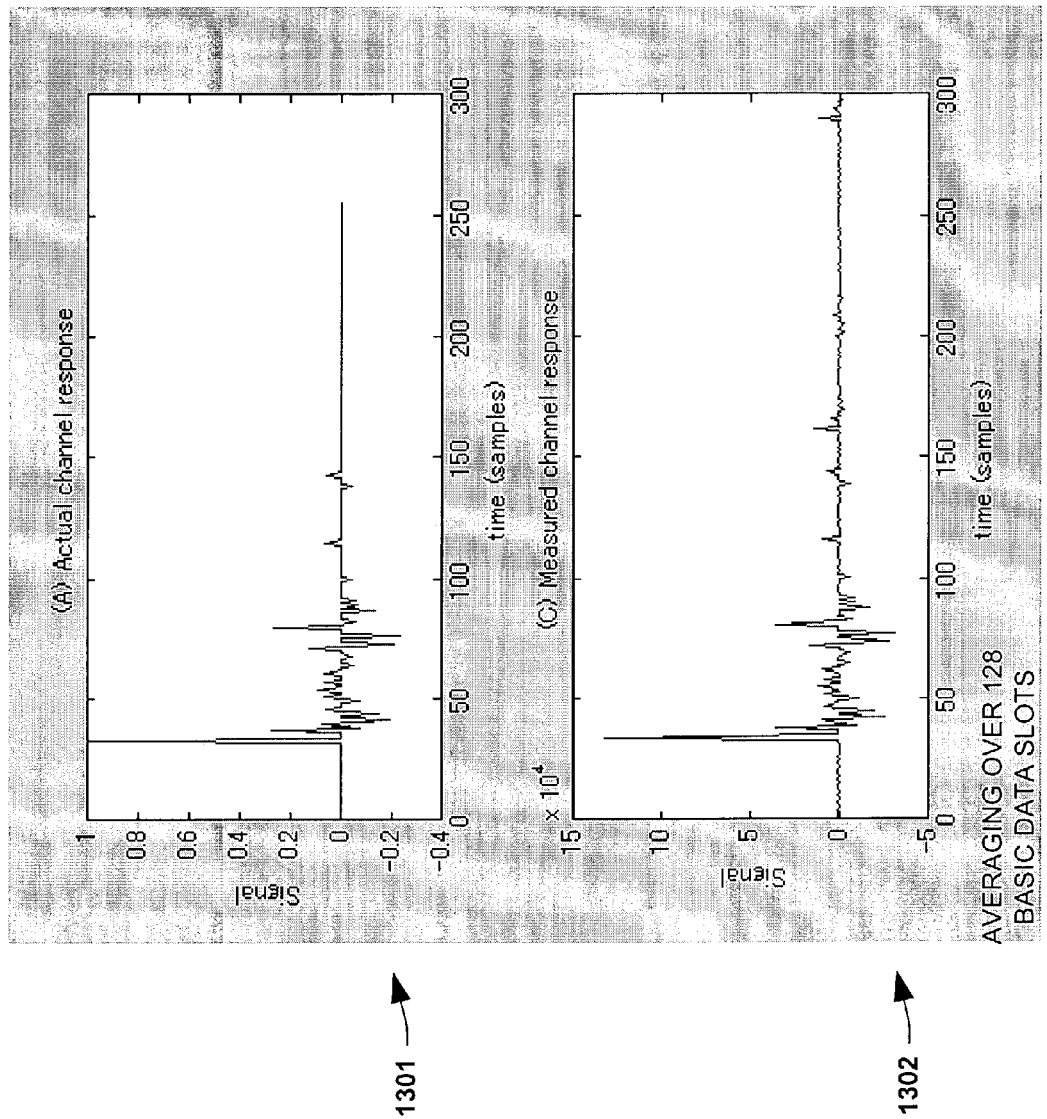
FIG. 13 is a graph illustrating a simulation of a communication employing code groups comprised of varied, auto-correlated codes and averaging over 128 basic data slots in accordance with an aspect of the present invention.

FIG. 13 depicts a simulation of a communication/transmission employing the code structure of FIG. 10, wherein code groups comprised of varied, auto-correlated codes are orthogonal to each other. An x-axis of FIG. 13 represents time (samples) and a y-axis represents signal strength. Plot 1301 simulates a transmitted signal, also referred to as an actual channel response and plot 1302 simulates a measured channel response. The simulation also assumes a residential environment, non-line-of-sight (NLOS) transmission paths, and a communication distance of about 4.4 meters. A sample time of 250 psec is used, which results in a duration of about 25 nsec for 100 sample times. As a result, one information bit is spread over 32 impulse signals and has a duration of about 8 nsec. The transmitted signal of plot 1301 includes a largest-power path at the $20^{th}$ sample time (within the spreading-code duration of 32 sample time) and two delayed paths that occur at the $50^{th}$ sample time and the $77^{th}$ sample time.

As stated above, plot 1302 depicts a measured channel response (e.g., received and processed via a matched filter at a receiver station) in which spreading code comprised of orthogonal groups of auto-correlated and varied codes (e.g., Gold codes) are used to code-spread the information bits. Subsequent channel impulse responses for a number of data blocks are added together to reduce noise in the measured channel response.

The measured channel response is averaged over 128 basic data slots in this simulation. A substantial reduction in noise is noticeable from the plot 1302, as compared with plot 902 of FIG. 9, plot 1102 of FIG. 11, and plot 1202 of FIG. 12. However, some noise is still visible in the measured channel response.

Figure 14:
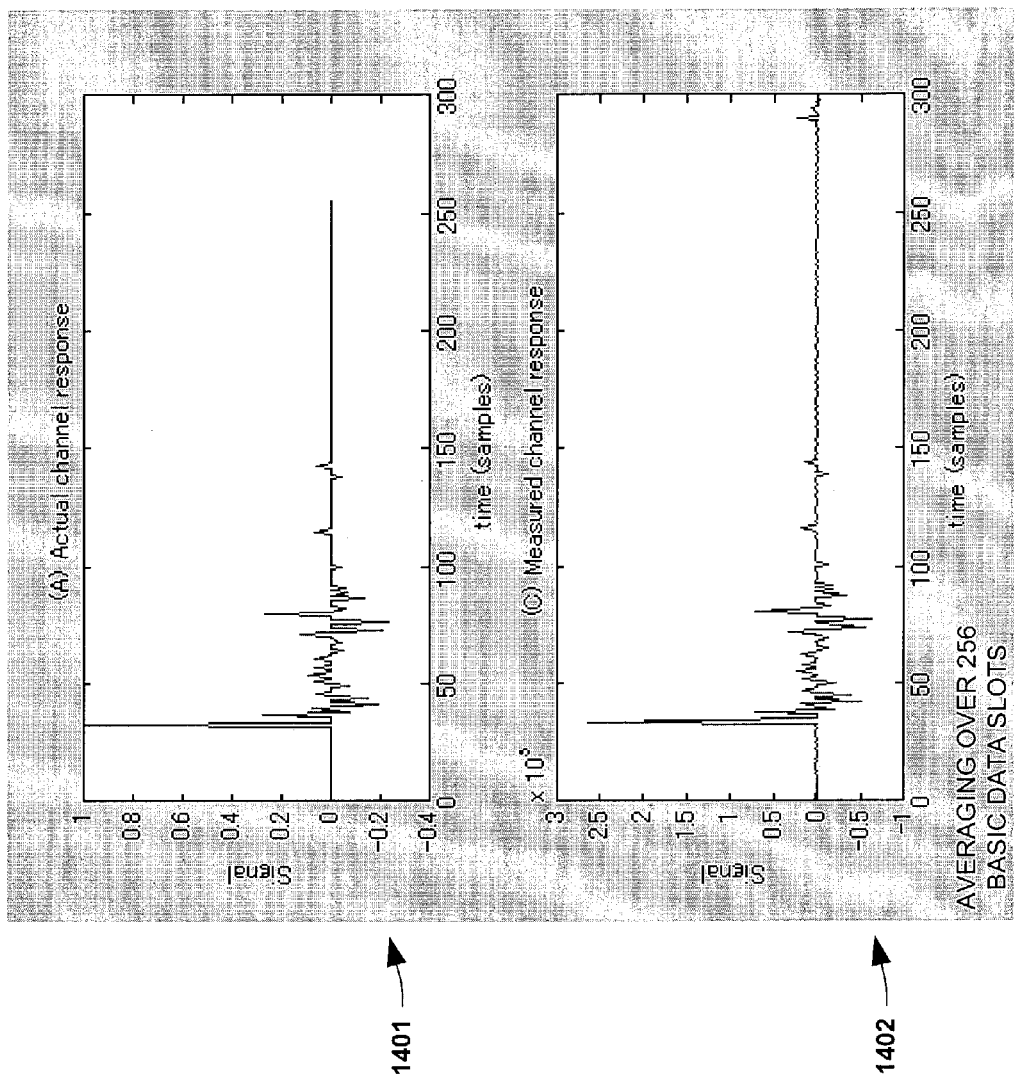
FIG. 14 is a graph illustrating a simulation of a communication employing code groups comprised of varied, auto-correlated codes and averaging over 256 basic data slots in accordance with an aspect of the present invention.

FIG. 14 depicts a simulation of a communication/transmission employing the code structure of FIG. 10, wherein code groups comprised of varied, auto-correlated codes are orthogonal to each other. An x-axis of FIG. 14 represents time (samples) and a y-axis represents signal strength. Plot 1401 simulates a transmitted signal, also referred to as an actual channel response and plot 1402 simulates a measured channel response. The simulation also assumes a residential environment, non-line-of-sight (NLOS) transmission paths, and a communication distance of about 4.4 meters. A sample time of 250 psec is used, which results in a duration of about 25 nsec for 100 sample times. As a result, one information bit is spread over 32 impulse signals and has a duration of about 8 nsec. The transmitted signal of plot 1401 includes a largest-power path at the $20^{th}$ sample time (within the spreading-code duration of 32 sample time) and two delayed paths that occur at the $50^{th}$ sample time and the $77^{th}$ sample time.

As stated above, plot 1402 depicts a measured channel response (e.g., received and processed via a matched filter at a receiver station) in which spreading code comprised of orthogonal groups of auto-correlated and varied codes (e.g., Gold codes) are used to code-spread the information bits. Subsequent channel impulse responses for a number of data blocks are added together to reduce noise in the measured channel response.

The measured channel response is averaged over 256 basic data slots in this simulation. A relatively small reduction in noise is noticeable from the plot 1402, as compared with plot 1302 of FIG. 13.

Figure 15:
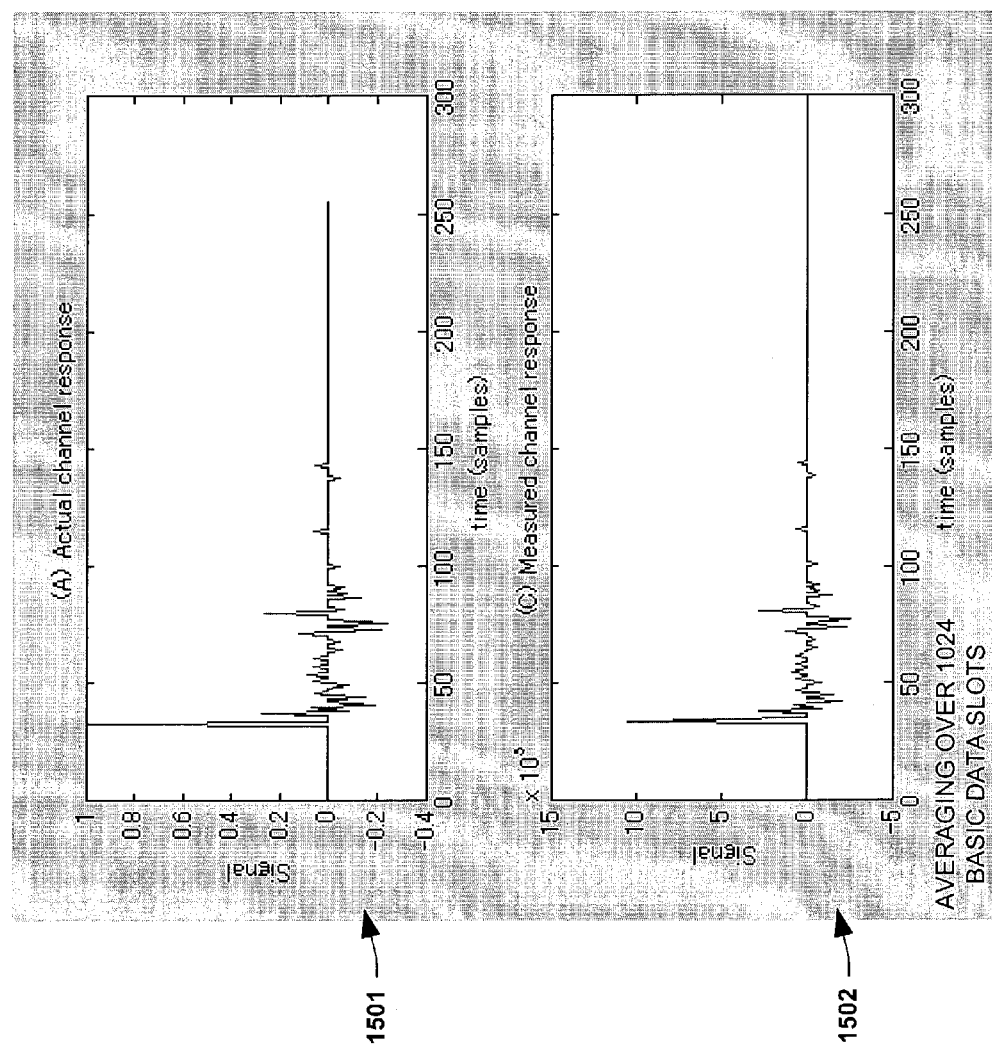
FIG. 15 is a graph illustrating a simulation of a communication employing code groups comprised of varied, auto-correlated codes and averaging over 1024 basic data slots in accordance with an aspect of the present invention.

FIG. 15 depicts a simulation of a communication/transmission employing the code structure of FIG. 10, wherein code groups comprised of varied, auto-correlated codes are orthogonal to each other. An x-axis of FIG. 15 represents time (samples) and a y-axis represents signal strength. Plot 1501 simulates a transmitted signal, also referred to as an actual channel response and plot 1502 simulates a measured channel response. The simulation also assumes a residential environment, non-line-of-sight (NLOS) transmission paths, and a communication distance of about 4.4 meters. A sample time of 250 psec is used, which results in a duration of about 25 nsec for 100 sample times. As a result, one information bit is spread over 32 impulse signals and has a duration of about 8 nsec. The transmitted signal of plot 1501 includes a largest-power path at the $20^{th}$ sample time (within the spreading-code duration of 32 sample time) and two delayed paths that occur at the $50^{th}$ sample time and the $77^{th}$ sample time.

As stated above, plot 1502 depicts a measured channel response (e.g., received and processed via a matched filter at a receiver station) in which spreading code comprised of orthogonal groups of auto-correlated and varied codes (e.g., Gold codes) are used to code-spread the information bits. Subsequent channel impulse responses for a number of data blocks are added together to reduce noise in the measured channel response.

The measured channel response is averaged over 1024 basic data slots in this simulation. As a result, the measured channel response is substantially the same as the actual channel response.

Figure 16:
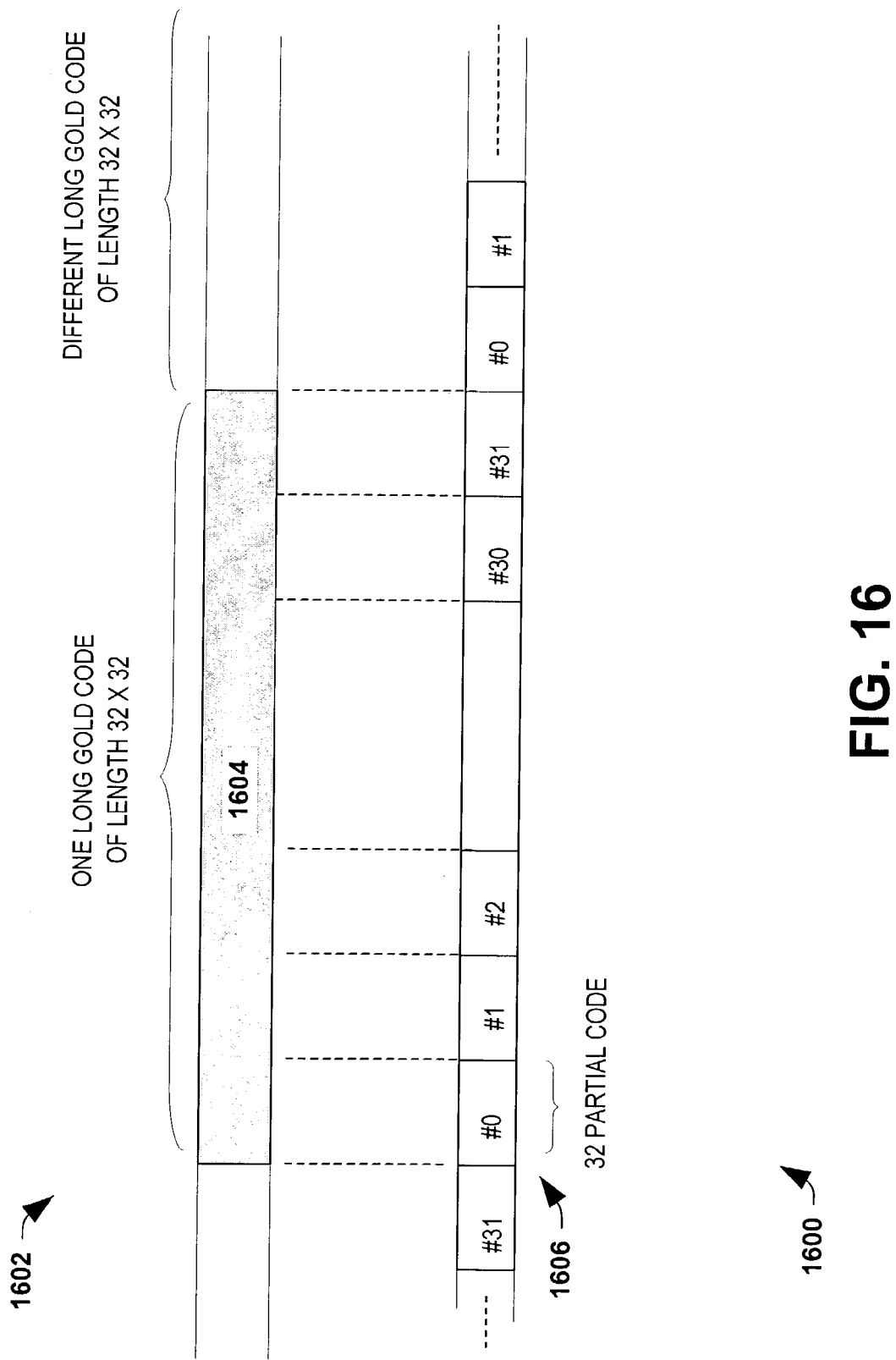
FIG. 16 is a diagram illustrating spreading code in accordance with an aspect of the present invention.

FIG. 16 is a diagram depicting exemplary spreading code 1600 in accordance with an aspect of the present invention. The spreading code generated permits adding channel impulse response estimates or channel estimates over code intervals or groups so as to reduce estimation noise. Additionally, the spreading code generated facilitates multipath reconciliation, particularly for indoor delay environments.

A series of one or more long, auto-correlated codes 1602 (e.g., long Gold code) are illustrated in FIG. 16. An appropriate sequence generator can generate the series 1602. Respective long codes in the series 1602 have a specified length. As an example, a long Gold code that has a specified length of 1024 and includes 1024 different Gold codes can be used for the series 1602. The respective long codes are segmented into a number of groups or segments, also referred to as basic data slots. As an example, a long Gold code 1604 that has a specified length of 1024 (32×23) is segmented into 32 groups or basic data slots 1606 each comprised of 32 codes. A segmenter or segmentation component can be employed to segment the long code into blocks. The specified length of the long codes is large enough to provide a sufficient number of non-repeated groups or groups varied from each other. As such, the long codes can be cyclically repeated, which in this example is every 1024 codes. The long codes (e.g., long Gold codes) have a relatively good auto-correlation property that is still present in shorter length intervals. As a result, codes in the respective code groups remain relatively auto-correlated.

Some exemplary suitable long codes that can be employed include Walsh-Hadamard (simply Walsh or Hadamard code), M-sequence, Gold-code and Kasami code. The Walsh-Hadamard code has the length of $2^n$ (n=1, 2, 3, ...), M-sequence, Gold code and Kasami code generally have the length of $2^n-1$ (n is the length of the shift registers that generate the code).

For receiver operation, the different code blocks 1608 are varied unlike the spreading code 800 of FIG. 8, in which subsequent code blocks or groups are identical. As a result, the good auto-correlation of the long Gold code introduces the desired correlation property to the basic data slots (code groups), which in turn reduces estimation noise when subsequent basic data blocks are summed together.

Figure 17:
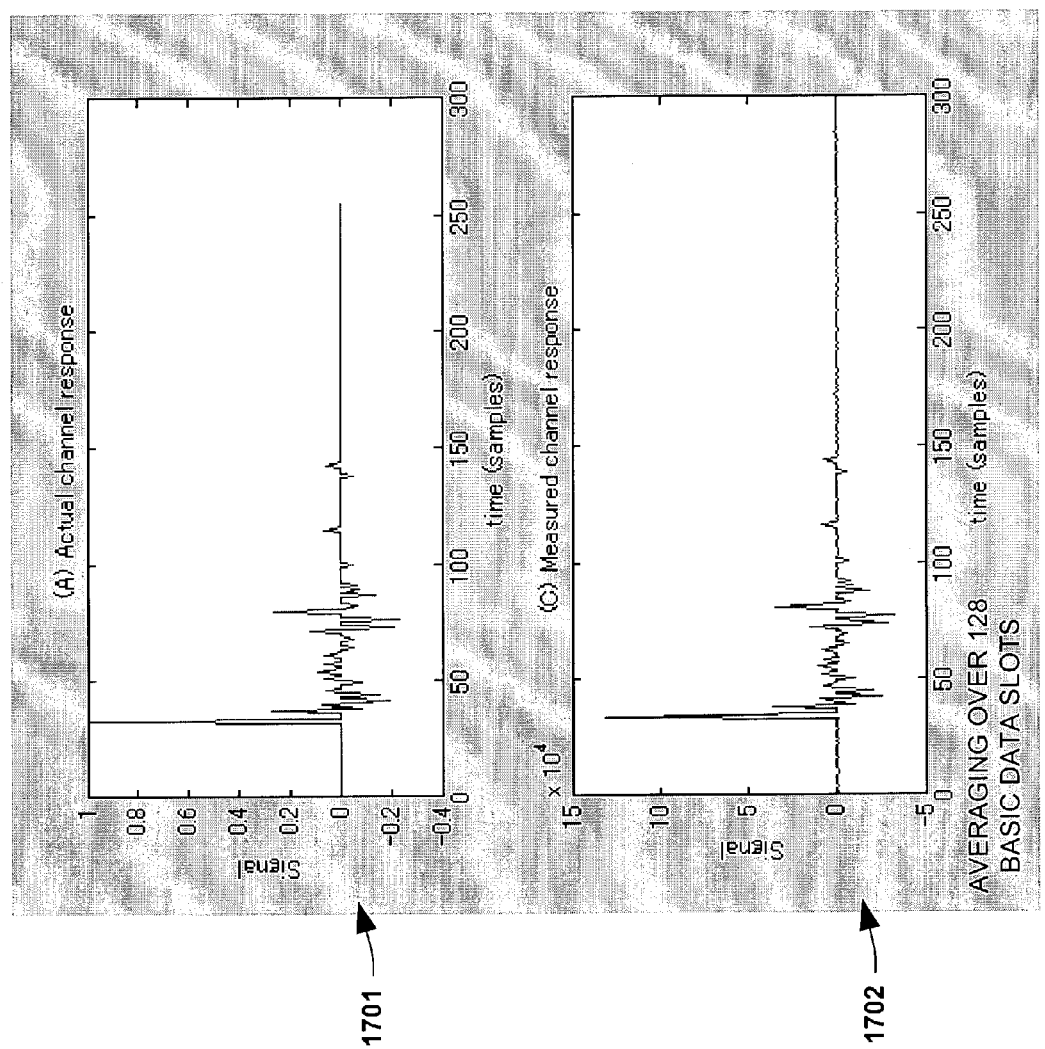
FIG. 17 is a graph illustrating a simulation of a communication employing code groups comprised of varied, auto-correlated codes and averaging over 128 basic data slots in accordance with an aspect of the present invention.

FIG. 17 depicts a simulation of a communication/transmission employing the code structure of FIG. 16, wherein code groups are segmented from a long varied, auto-correlated code and, therefore, respectively comprise varied, auto-correlated codes. An x-axis of FIG. 17 represents time (samples) and a y-axis represents signal strength. Plot 1701 simulates a transmitted signal, also referred to as an actual channel response and plot 1702 simulates a measured channel response. The simulation also assumes a residential environment, non-line-of-sight (NLOS) transmission paths, and a communication distance of about 4.4 meters. A sample time of 250 psec is used, which results in a duration of about 25 nsec for 100 sample times. As a result, one information bit is spread over 32 impulse signals and has a duration of about 8 nsec. The transmitted signal of plot 1701 includes a largest-power path at the $20^{th}$ sample time (within the spreading-code duration of 32 sample time) and two delayed paths that occur at the $50^{th}$ sample time and the $77^{th}$ sample time.

As stated above, plot 1702 depicts a measured channel response (e.g., received and processed via a matched filter at a receiver station) in which spreading code comprised of varied, auto-correlated codes (e.g., segments of long Gold codes) are used to code-spread and de-spread the information bits. Subsequent channel impulse responses for a number of data blocks are added together to reduce noise in the measured channel response.

The measured channel response is averaged over 128 basic data slots or groups in this simulation. A substantial reduction in noise is noticeable from the plot 1702, as compared with plot 902 of FIG. 9. However, some noise is still visible in the measured channel response.

The estimation noise reductions obtained by use of the spreading codes of FIG. 10 and FIG. 16 are substantially similar. Generally, the more basic data slots averaged, the better the estimate noise reduction. One suitable number of basic data slots to average can be determined by dividing a maximum channel impulse response time interval by the impulse interval. Such a number of basic data slots appears to substantially diminish estimation noise without introducing unnecessary complexity into the receiver operation. However, the number of basic data slots employed can significantly vary and yet still be in accordance with the present invention. As an example, a channel impulse response time interval of 100 nsec and an impulse interval of 250 psec, suggest that (100 nsec/250 psec) 400 basic data slots can be employed as a suitable number to average over.

In view of the foregoing structural and functional features described supra, methodologies in accordance with various aspects of the present invention will be better appreciated with reference to FIGS. 18-21. While, for purposes of simplicity of explanation, the methodologies of FIGS. 18-21 are depicted and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

Figure 18:
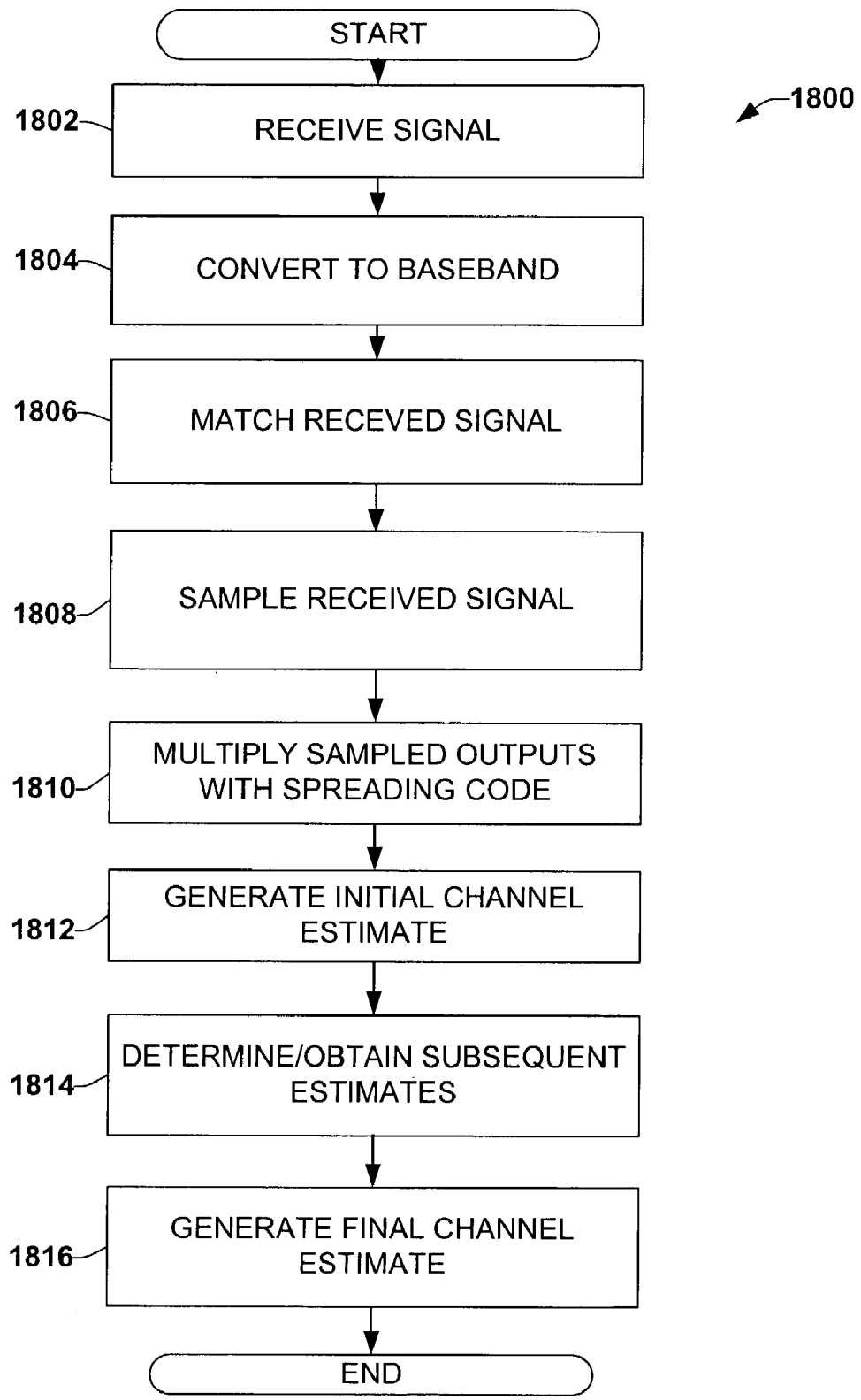
FIG. 18 is a flow diagram illustrating a method of resolving a received signal in accordance with an aspect of the present invention.

Turning now to FIG. 18, a flow diagram of a method 1800 of resolving a received signal in accordance with an aspect of the present invention is depicted.

The method 1800 begins at block 1802 where a signal is received by a receiving device (e.g., antenna) and converted from analog to digital. The received signal comprises a transmitted signal and a number of multipath signals and may also include other unwanted or undesired signals. It is appreciated that a line-of-sight signal may not be present in the received signal and that signals of the received signal can be delayed in varied amounts. The received signal is generally at a transmission band or ultra wide band frequency and is converted to a baseband frequency at block 1804. The transmission band is more suitable for transmitting and propagating signals whereas the baseband is more suitable for processing via electronic devices (e.g., circuits, computers, and the like). The transmitted signal comprises information bits spread via an auto-correlated spreading code groups that are themselves correlated so as to reduce channel impulse response estimation noise.

An analog filter matches the received signal to an incoming impulse signal shape at block 1806. The received signal is then sampled and synchronously input and passed through a series of shift registers at block 1808. Outputs of the shift registers, portions of the sampled received signal, are multiplied with de-spreading code at block 1810. The de-spreading code is comprised of a number of code blocks or groups referred to as basic data slots. The code within the code blocks is auto-correlated and varied with respect to each other. The code blocks or groups are correlated with each other such that adding or averaging channel estimates for subsequent or consecutive code blocks can mitigate estimation noise. FIG. 10 and FIG. 16 illustrate suitable de-spreading code that can be employed with this method 1800.

Products of the de-spreading code and the sampled received signal are added together at block 1812 to provide an initial channel estimate for a single code block or group. A number of subsequent channel estimates for subsequent code groups are determined at 1814. These subsequent channel estimates are added to or averaged with the initial channel estimate resulting in a final channel estimate at block 1816. The final channel estimate has reduced channel estimation noise because of the added or averaged subsequent channel estimates.

Figure 19:
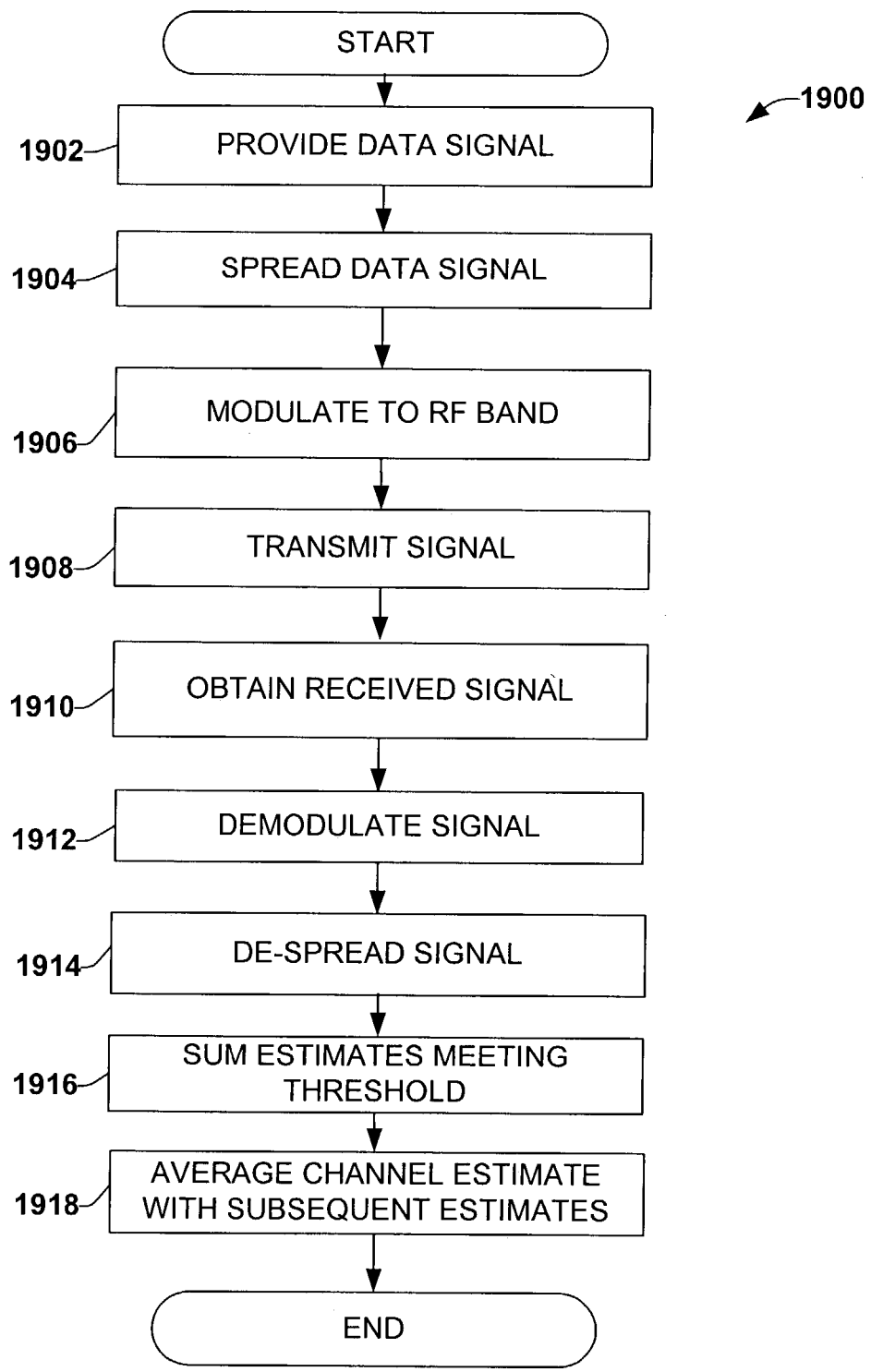
FIG. 19 is a flow diagram illustrating a method of communicating via ultra wide band communication in accordance with an aspect of the present invention.

FIG. 19 is a flow diagram illustrating a method 1900 of communicating via ultra wide band communications in accordance with an aspect of the present invention.

The method 1900 begins at block 1902 wherein a data signal is provided. The data signal can comprise database information, voice data, multimedia data, applications data and the like. The data signal can be generated by converting an analog signal (e.g., video or audio) into the data signal and can be in a compressed and/or encrypted format. The data signal is spread according to spreading code into groups of impulse signals or code groups for each information bit of the data signal at block 1904. The spreading code is auto-correlated and is selected so as to be varied for consecutive codes, as described supra. Additionally, the code groups are correlated to each other so as to reduce channel estimate noise (e.g., orthogonal). The spread signal is converted from a digital signal to an analog signal and then modulated from a baseband frequency to an ultra wide band frequency at block 1906. The ultra wide band frequency is suitable for transmission. The signal is then transmitted in all or a plurality of directions at block 1908.

Continuing at block 1910, a received signal is obtained via an antenna or other suitable receiving device. The received signal is demodulated from the ultra wide band frequency to the baseband frequency at block 1912 and converted from an analog signal to a digital signal. The received signal substantially comprises the data signal along with multipath signals and other unwanted/undesired signals. The received signal is then de-spread via de-spreading code at block 1914. The de-spread signals are utilized to compute channel estimates at block 1916 and can sum only those estimates that meet or exceed a threshold value. Additionally, a number of subsequent channel estimates are to be added to each of the computed channel estimates in order to reduce estimation noise at block 1918 and thereby resulting in a received data signal. Generally, addition of more subsequent channel estimates results in less channel noise. The received data signal is substantially similar to the data signal that was spread and transmitted and can undergo additional processing (e.g., de-compress, decrypt, error correction, and the like).

Figure 20:
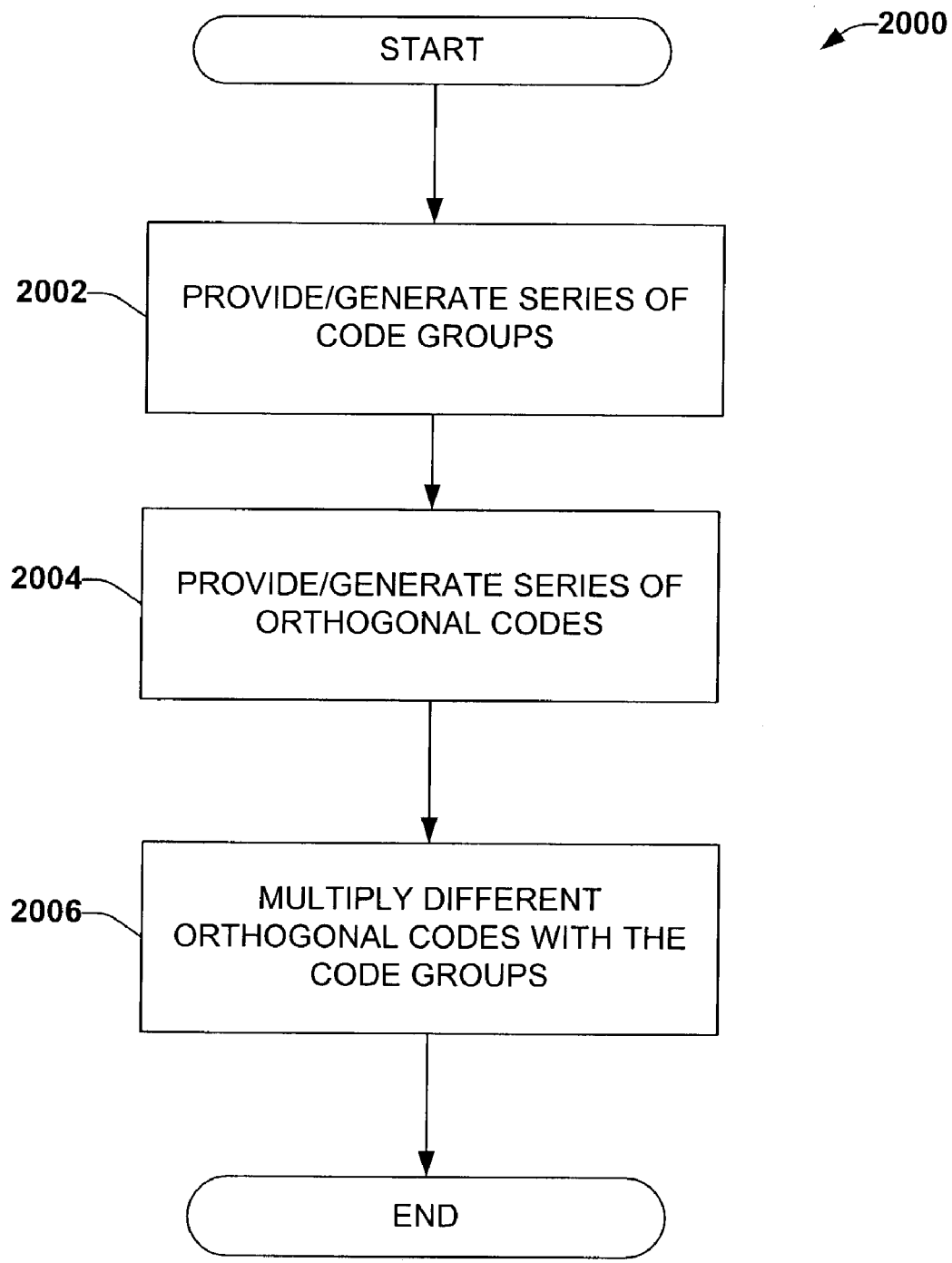
FIG. 20 is a flow diagram illustrating a method of generating spreading code in accordance with an aspect of the present invention.

FIG. 20 is a flow diagram illustrating a method 2000 of generating spreading code in accordance with an aspect of the present invention. The generated spreading code is comprised of groups of auto-correlated and varied codes. The groups are correlated with each other (e.g., orthogonally) such that addition of subsequent channel estimates for subsequent groups can reduce channel estimation noise.

A code group is provided at block 2002, wherein codes within the code group are auto-correlated and varied (e.g., Gold codes). The code group includes a number of codes (e.g., 16 or 32) that individually can be employed to spread or de-spread a single information bit. A series of orthogonal codes is provided at block 2004. The series has a number of codes (e.g., 1024) sufficient to permit channel estimation noise reduction. A suitable type of orthogonal codes is the Hadamard (Walsh) codes.

Individual orthogonal codes of the series are multiplied with the code group to generate a number of basic code groups at block 2006. The number of basic code groups generated is equal to the number of orthogonal codes in the series (e.g., 1024). As a result of introduced orthogonality, the basic code groups are substantially orthogonal to each other. Yet, codes within the basic code groups remain substantially auto-correlated. These basic code groups can then be employed to spread and de-spread information bits in a communications system. Additionally, these basic code groups permit reducing channel impulse response estimation noise by adding subsequent channel estimates.

Figure 21:
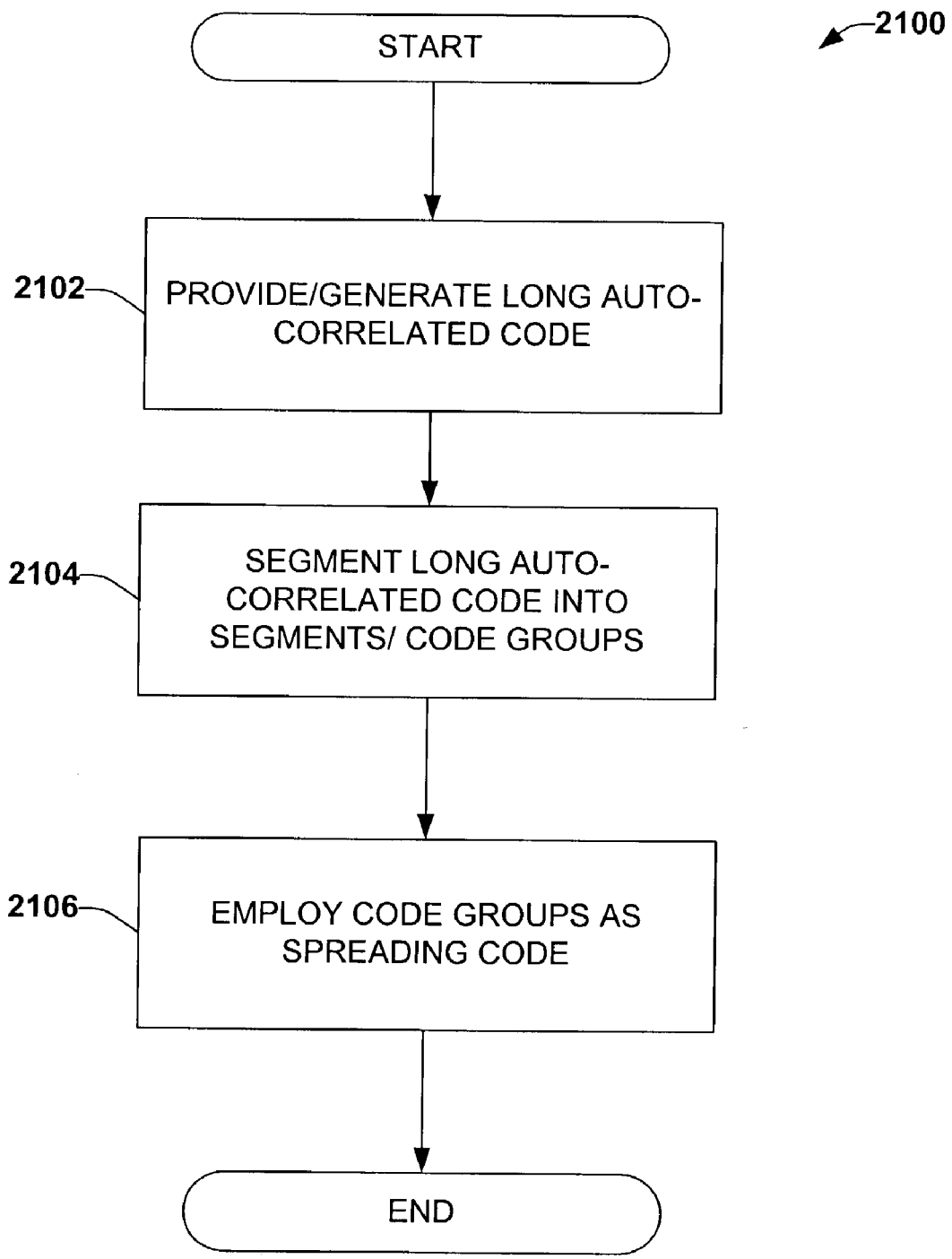
FIG. 21 is a flow diagram illustrating a method of generating spreading code in accordance with an aspect of the present invention.

Turning now to FIG. 21, a flow diagram illustrating another method 2100 of generating spreading code in accordance with an aspect of the present invention is depicted. The generated spreading code is comprised of groups of auto-correlated and varied codes. The groups are correlated with each other such that addition of subsequent channel estimates for subsequent groups can reduce channel estimation noise.

The method 2100 begins at block 2102 wherein a long auto-correlated code is provided. Further, the long code has a specified length and includes a number of codes equal to its length. An example of a suitable long code is a long Gold code with a specified length of 1024. The long code is segmented into a number of groups at block 2104 such that each group has an equal number of codes within it. The long code has good auto-correlation, thus smaller segments of the long code also have good auto-correlation. Thus, the codes within each group remain auto-correlated. Additionally, the code groups are different from each other thus facilitating mitigation of channel estimation noise. The method 2100 can be repeated to generate a desired number of code groups, also referred to as basic data slots. These generated code groups can then be employed to spread and de-spread information bits in a communications system at block 2106. Additionally, these code groups permit reducing channel impulse response estimation noise by adding subsequent channel estimates.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A method of resolving a received signal comprising:
   matching a received signal to an incoming impulse signal shape, wherein the received signal comprises at least a transmitted signal along with a number of multipath signals;
   sampling the received signal;
   multiplying the sampled, received signal with de-spreading code;
   adding products of the received signal and the de-spreading code to obtain an initial channel estimate;
   obtaining subsequent channel estimates for a number of subsequent code groups; and
   averaging the initial channel estimate with the subsequent channel estimates to reduce estimation noise;

wherein the number of subsequent channel estimates used to reduce estimation noise is equal to a maximum channel impulse response time divided by an impulse interval.

2. The method of claim 1, wherein the de-spreading code is comprised of code groups that individually comprise varied, auto-correlated codes.

3. The method of claim 2, wherein the code groups are orthogonal to each other.

4. An ultra wide band communication system for low power, high data rate operation, the system comprising:

means for matching a received signal to an incoming impulse signal shape, wherein the received signal comprises at least a transmitted signal along with a number of multipath signals;

means for sampling the received signal;

means for multiplying the sample, received signal with de-spreading code;

means for adding products of the received signal and the de-spreading code to obtain an initial channel estimate;

means for obtaining subsequent channel estimates for a number of subsequent code groups; and means for averaging the initial channel estimate with the subsequent channel estimates to reduce estimation noise;

wherein the number of subsequent channel estimates used to reduce estimation noise is equal to a maximum channel impulse response time divided by an impulse interval.

5. The system of claim 4, wherein the de-spreading code is comprised of code groups that individually comprise varied, auto-correlated codes.

6. The system of claim 5, wherein the code groups are orthogonal to each other.

7. The system of claim 4, wherein the system has a maximum path delay of more than 100 nsec.

8. The system of claim 4, wherein the system comprises a mobile communication device.

9. The system of claim 4, wherein a distance between said means for sampling and a transmitter used to transmit said received signal is less than about 40 meters.

* * * * *